United States Patent
Ko et al.

(10) Patent No.: US 12,232,120 B2
(45) Date of Patent: Feb. 18, 2025

(54) METHOD AND DEVICE FOR REPORTING INFORMATION ABOUT SL HARQ FEEDBACK IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 449 days.

(21) Appl. No.: 17/630,060

(22) PCT Filed: Aug. 12, 2020

(86) PCT No.: PCT/KR2020/010664
§ 371 (c)(1),
(2) Date: Jan. 25, 2022

(87) PCT Pub. No.: WO2021/029663
PCT Pub. Date: Feb. 18, 2021

(65) Prior Publication Data
US 2022/0279504 A1 Sep. 1, 2022

Related U.S. Application Data

(60) Provisional application No. 62/886,992, filed on Aug. 15, 2019.

(51) Int. Cl.
*H04L 1/1812* (2023.01)
*H04W 72/21* (2023.01)
(Continued)

(52) U.S. Cl.
CPC .......... *H04W 72/21* (2023.01); *H04L 1/1812* (2013.01); *H04W 72/23* (2023.01); *H04W 72/56* (2023.01)

(58) Field of Classification Search
CPC .......... H04W 72/0413; H04W 72/042; H04W 72/10; H04W 72/04; H04L 1/1812
See application file for complete search history.

(56) References Cited

U.S. PATENT DOCUMENTS

2020/0267597 A1* 8/2020 Huang ................. H04W 76/14
2021/0028891 A1* 1/2021 Zhou ...................... H04W 4/40
(Continued)

FOREIGN PATENT DOCUMENTS

KR 10-2014-0080389 A 6/2014

OTHER PUBLICATIONS

Fujitsu, "Discussion on HARQ-ACK feedback for NR-V2X", R1-1901944, 3GPP TSG RAN WG1 #96, Athens, Greece,. Feb. 25-Mar. 1, 2019, see sections 2.1-2.2.
(Continued)

*Primary Examiner* — Kent Krueger
(74) *Attorney, Agent, or Firm* — BRYAN CAVE LEIGHTON PAISNER LLP

(57) ABSTRACT

Provided are a method for a first device to perform wireless communication, and a device supporting same. The method may include the steps of: receiving first downlink control information (DCI), including information related to a first physical uplink control channel (PUCCH) resource and information related to sidelink (SL) resource allocation, from a base station through a first physical downlink control channel (PDCCH); transmitting a physical sidelink control channel (PSCCH) and a physical sidelink shared channel (PSSCH) to a second device on the basis of the information related to the SL resource allocation; receiving SL hybrid automatic repeat request (HARQ) feedback from the second device through a physical sidelink feedback channel (PSFCH) related to the PSSCH; receiving second DCI, including information related a second PUCCH resource and
(Continued)

information related to downlink (DL) resource allocation, from the base station through a second PDCCH; receiving a physical downlink shared channel (PDSCH) related to the second PDCCH from the base station on the basis of information related to the DL resource allocation; and transmitting, on at least one of the first PUCCH resource or the second PUCCH resource, at least one of the SL HARQ feedback or HARQ feedback related to the PDSCH to the base station. Here, the first PUCCH resource and the second PUCCH resource may overlap in the time domain.

20 Claims, 31 Drawing Sheets

(51) Int. Cl.
  *H04W 72/23* (2023.01)
  *H04W 72/56* (2023.01)

(56) References Cited

U.S. PATENT DOCUMENTS

| | | | |
|---|---|---|---|
| 2021/0058907 A1* | 2/2021 | Fakoorian | H04W 76/14 |
| 2022/0103292 A1* | 3/2022 | Hwang | H04W 76/28 |
| 2022/0109527 A1* | 4/2022 | Hwang | H04W 72/23 |
| 2022/0141849 A1* | 5/2022 | Lee | H04L 1/1812 370/329 |
| 2022/0183002 A1* | 6/2022 | Yeo | H04L 1/1607 |
| 2022/0201654 A1* | 6/2022 | Lee | H04W 72/20 |
| 2022/0232523 A1* | 7/2022 | Lee | H04L 47/125 |
| 2022/0321308 A1* | 10/2022 | Yu | H04L 1/1812 |
| 2022/0408455 A1* | 12/2022 | Yoshioka | H04W 72/569 |
| 2023/0040257 A1* | 2/2023 | Yoshioka | H04W 72/569 |
| 2023/0246744 A1* | 8/2023 | Yoshioka | H04L 1/1671 370/328 |

OTHER PUBLICATIONS

Mediatek Inc., "NR sidelink mode-1 resource allocation", R1-1906554, 3GPP TSG RAN1 WG1 Meeting #97, Reno, USA, May 13-17, 2019, see sections 2.2-2.3.

Intel Corporation, "Physical layer procedures for NR V2X sidelink communication", R1-1906799, 3GPP TSG RAN WG1 Meeting #97, Reno, USA, May 13-17, 2019, see section 2.3.

Mediatek Inc., "On sidelink SR", R2-1903876, 3GPP TSG-RAN WG2 Meeting #105bis, Xi'an, China, Apr. 8-12, 2019, see section 2.2.

* cited by examiner

FIG. 4
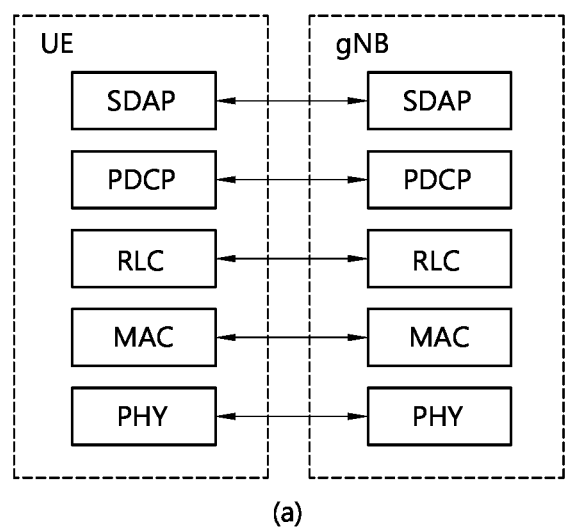
(a)
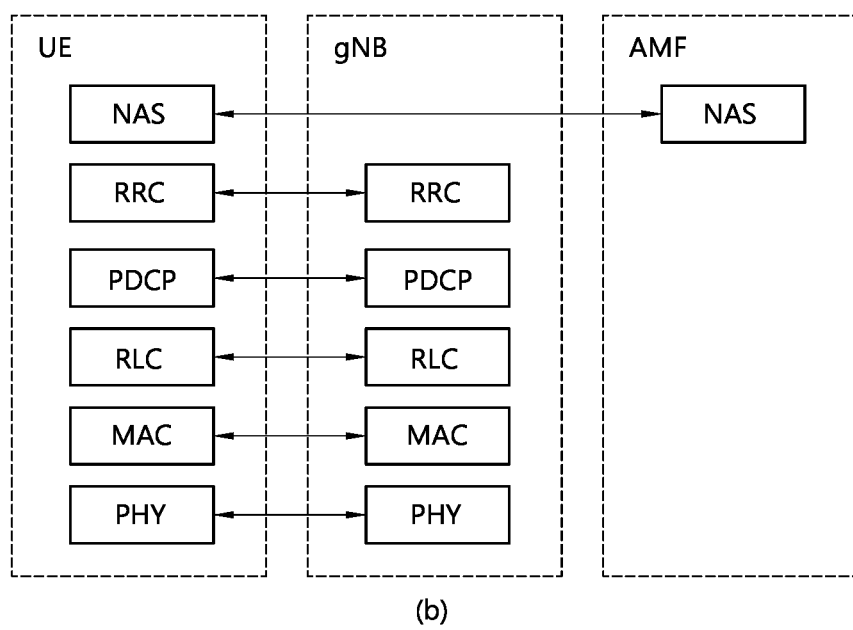
(b)

FIG. 8
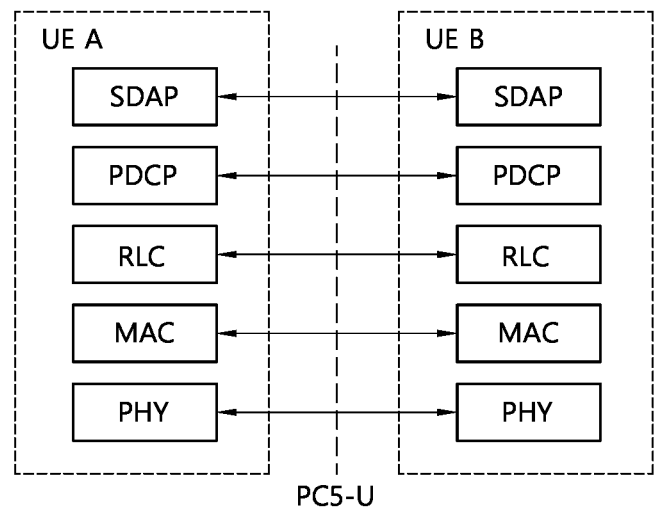
(a)
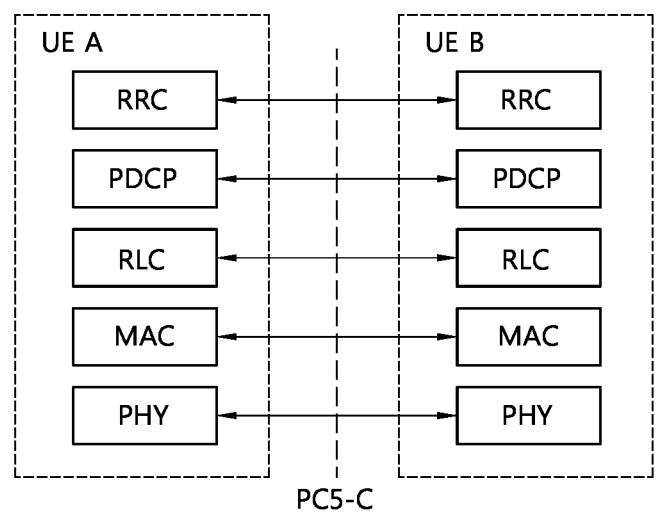
(b)

METHOD AND DEVICE FOR REPORTING INFORMATION ABOUT SL HARQ FEEDBACK IN NR V2X

This application is the National Stage filing under 35 U.S.C. 371 of International Application No. PCT/KR2020/010664, filed on Aug. 12, 2020, which claims the benefit of and priority to U.S. Provisional Application No. 62/886,992, filed on Aug. 15, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, a transmitting UE may transmit SL HARQ feedback received from a receiving UE to a base station through a PUCCH. In addition, the base station may transmit a PDSCH to the transmitting UE, and the transmitting UE may transmit HARQ feedback corresponding to the PDSCH to the base station through a PUCCH. In this case, the transmitting UE needs to perform different operations according to how the base station allocates a PUCCH resource for SL HARQ feedback report and a PUCCH resource for HARQ feedback.

Technical Solutions

In one embodiment, a method for performing wireless communication by a first device is provided. The method may comprise: receiving, from a base station through a first physical downlink control channel (PDCCH), a first downlink control information (DCI) including information related to a first physical uplink control channel (PUCCH) resource and information related to sidelink (SL) resource allocation; transmitting, to a second device, a physical sidelink control channel (PSCCH) and a physical sidelink shared channel (PSSCH) based on the information related to the SL resource allocation; receiving, from the second device through a physical sidelink feedback channel (PSFCH) related to the PSSCH, SL hybrid automatic repeat request (HARQ) feedback; receiving, from the base station through a second PDCCH, a second DCI including information related to a second PUCCH resource and information related to a downlink (DL) resource allocation; receiving, from the base station, a physical downlink shared channel (PDSCH) related to the second PDCCH based on the information related to the DL resource allocation; and transmitting, to the base station, at least one of the SL HARQ feedback or the HARQ feedback related to the PDSCH on at least one of the first PUCCH resource and the second PUCCH resource, wherein the first PUCCH resource and the second PUCCH resource are overlapped in a time domain.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a base station through a first physical downlink control channel (PDCCH), a first downlink control information (DCI) including information related to a first physical uplink control channel (PUCCH) resource and information related to sidelink (SL) resource allocation; transmit, to a second device, a physical sidelink control channel (PSCCH) and a physical sidelink shared channel (PSSCH) based on the information related to the SL resource allocation; receive, from the second device through a physical sidelink feedback channel (PSFCH) related to the PSSCH, SL hybrid automatic repeat request (HARQ) feedback; receive, from the base station through a second PDCCH, a second DCI including information related to a second PUCCH resource and information related to a downlink (DL) resource allocation; receive, from the base station, a physical downlink shared channel (PDSCH) related to the second PDCCH based on the information related to the DL resource allocation; and transmit, to the base station, at least one of the SL HARQ feedback or the HARQ feedback related to the PDSCH on at least one of the first PUCCH resource and the second PUCCH resource, wherein the first PUCCH resource and the second PUCCH resource are overlapped in a time domain.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
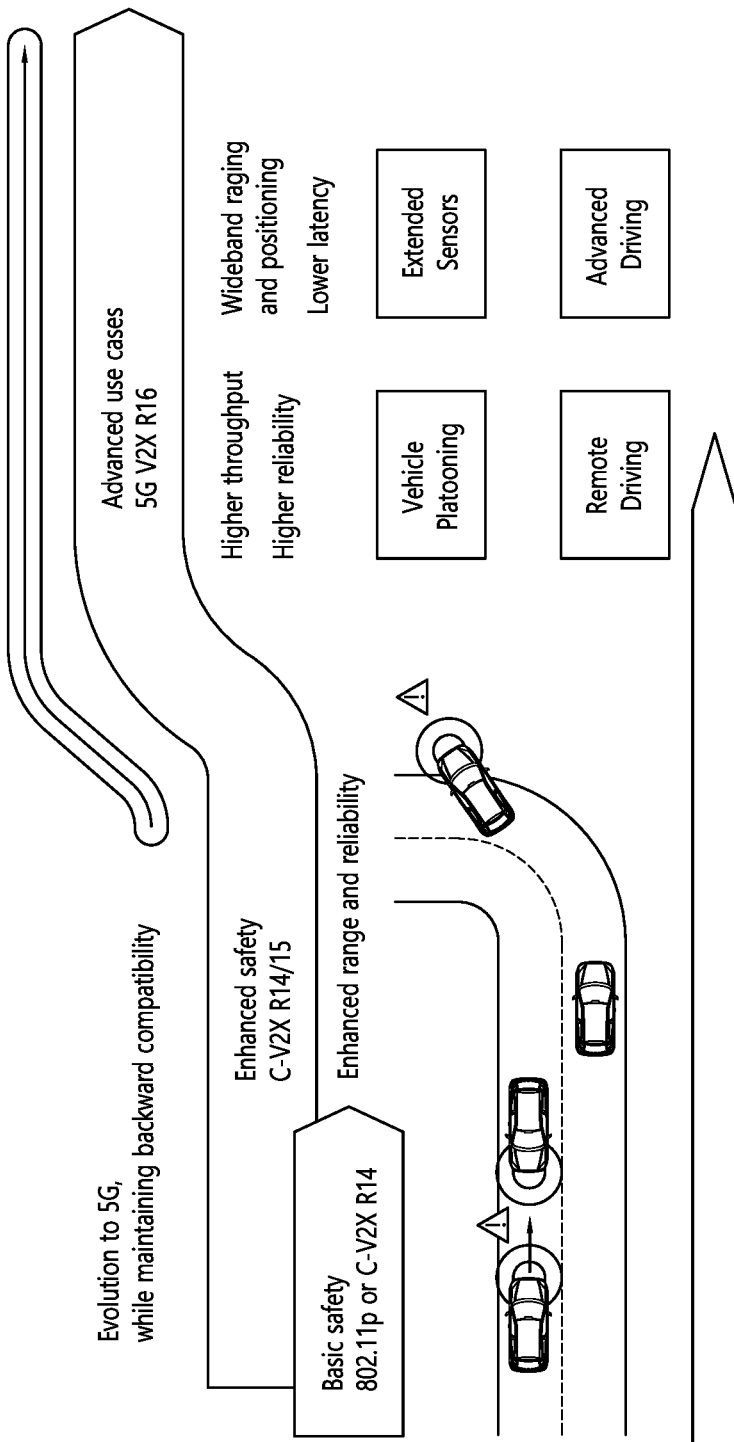
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
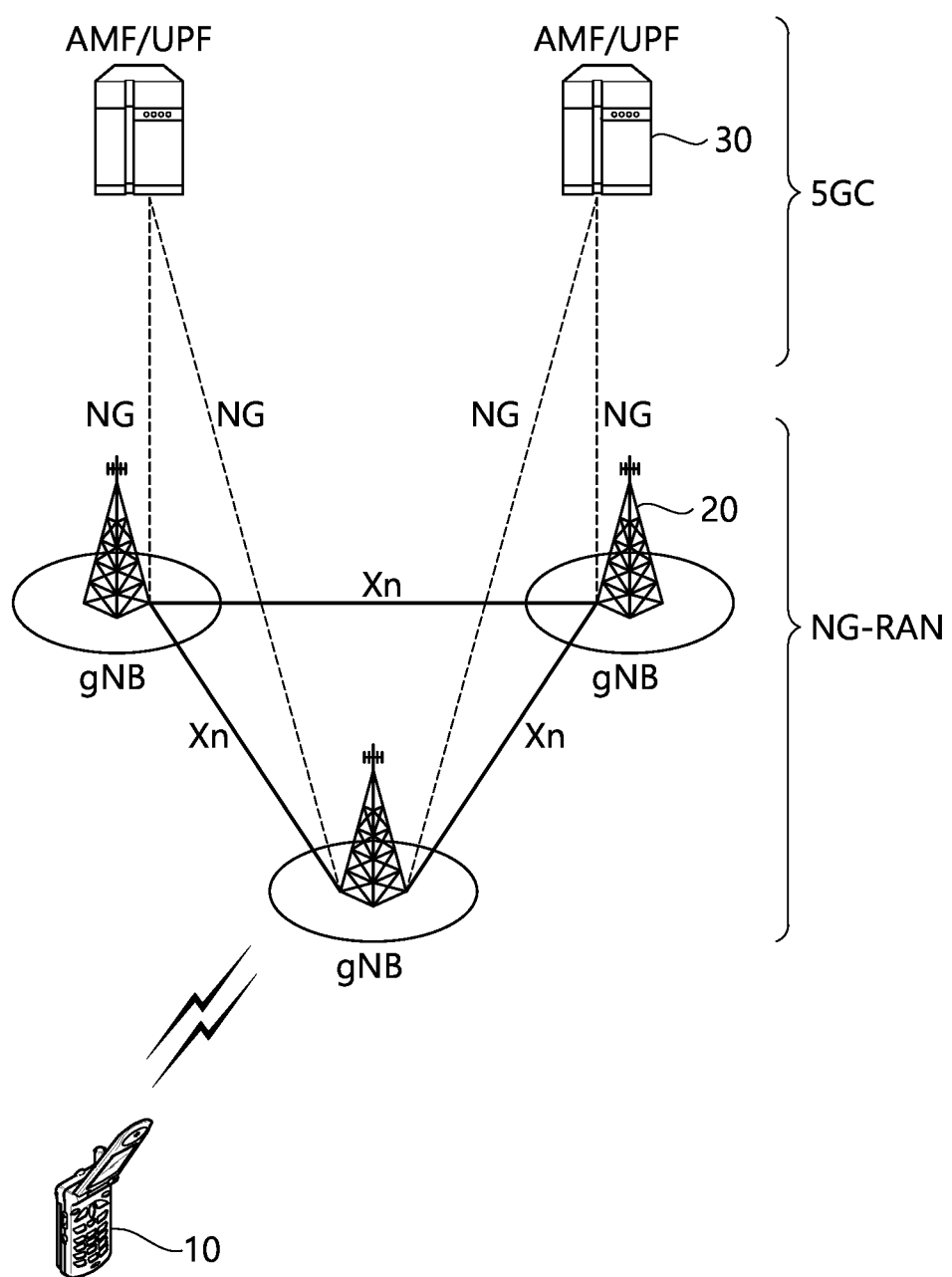
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
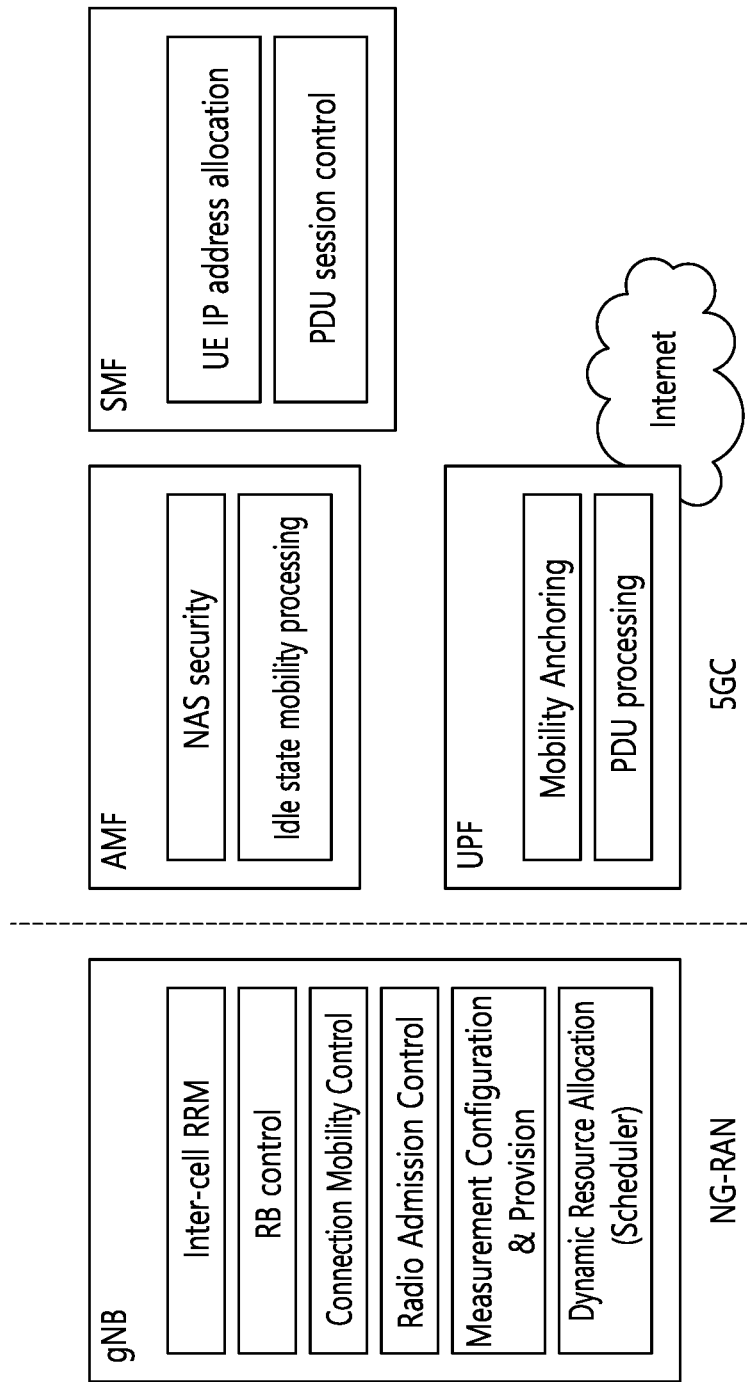
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
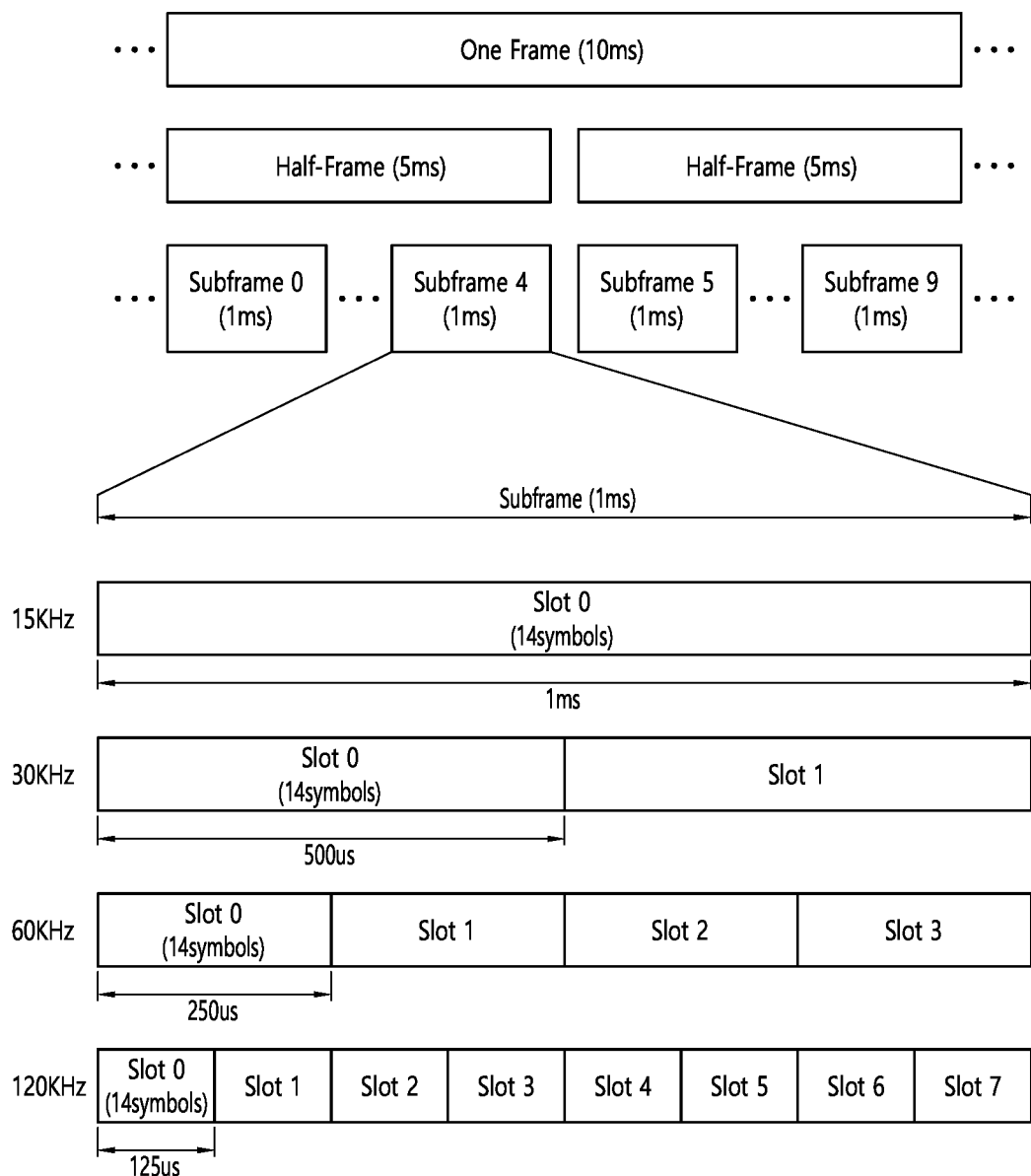
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier- FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
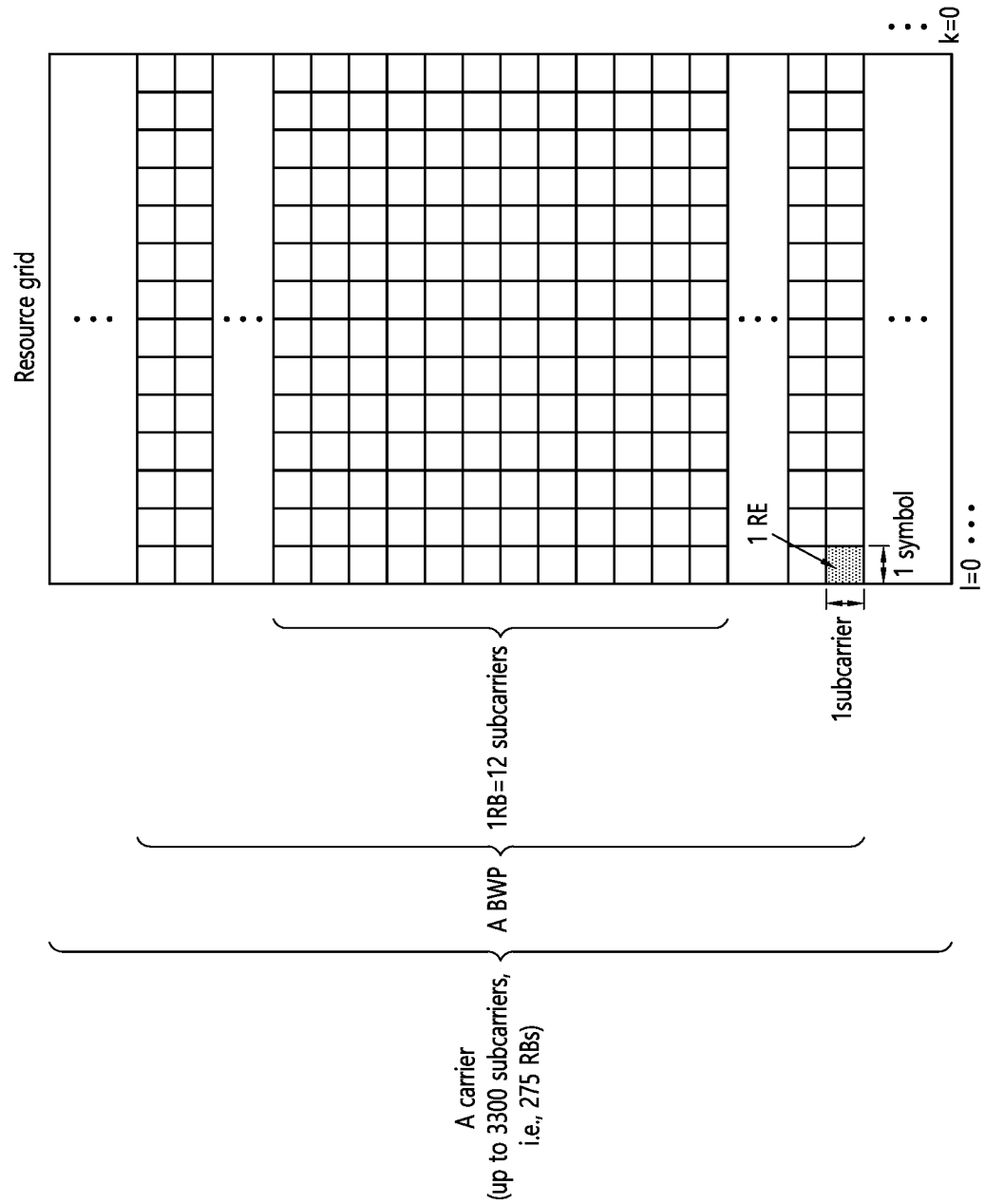
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
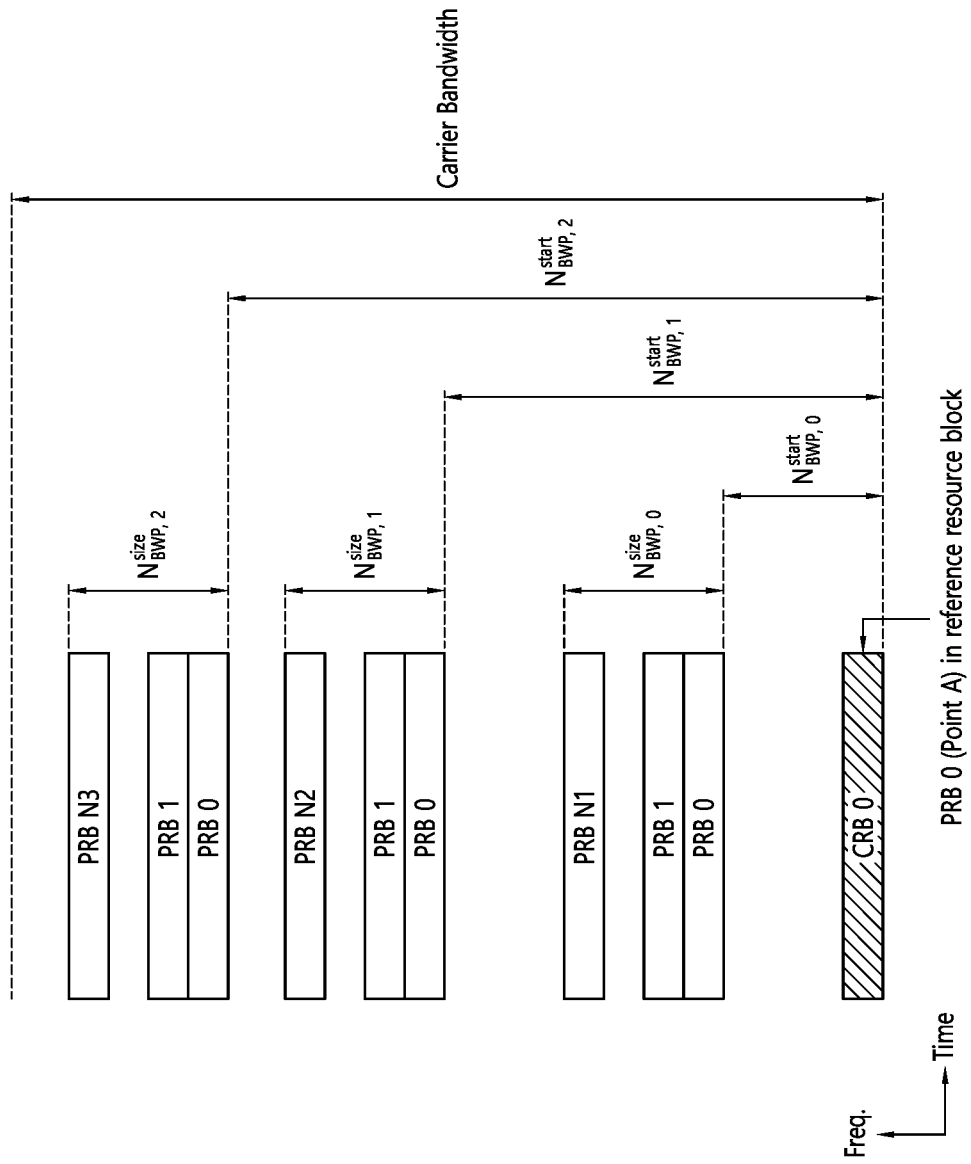
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
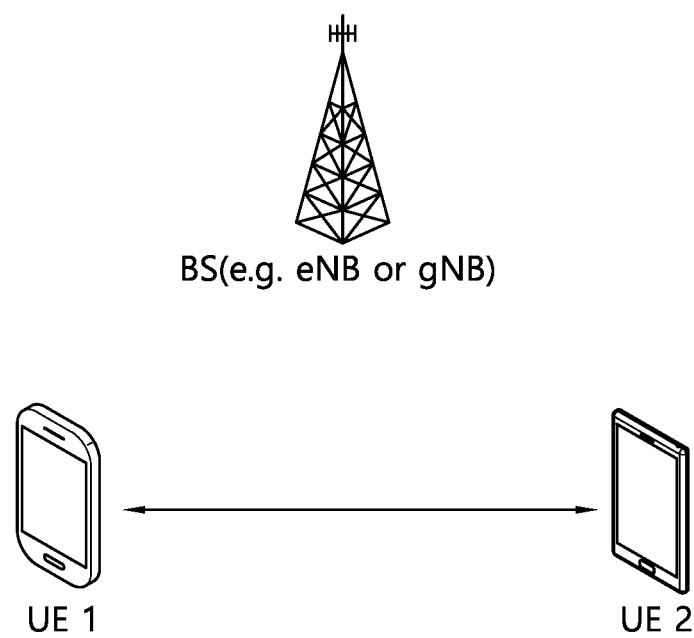
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
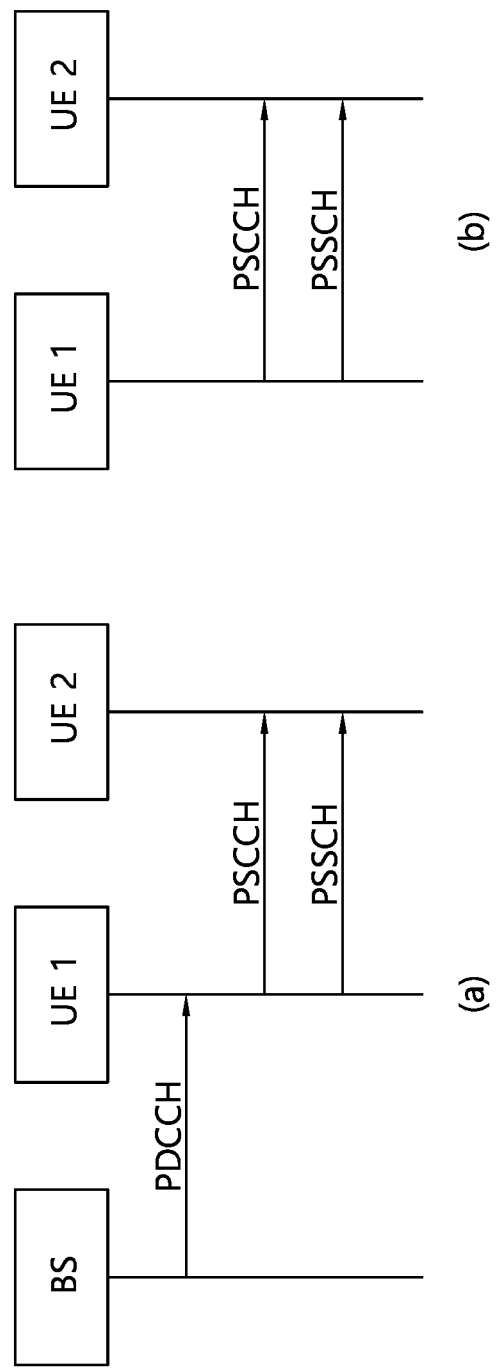
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
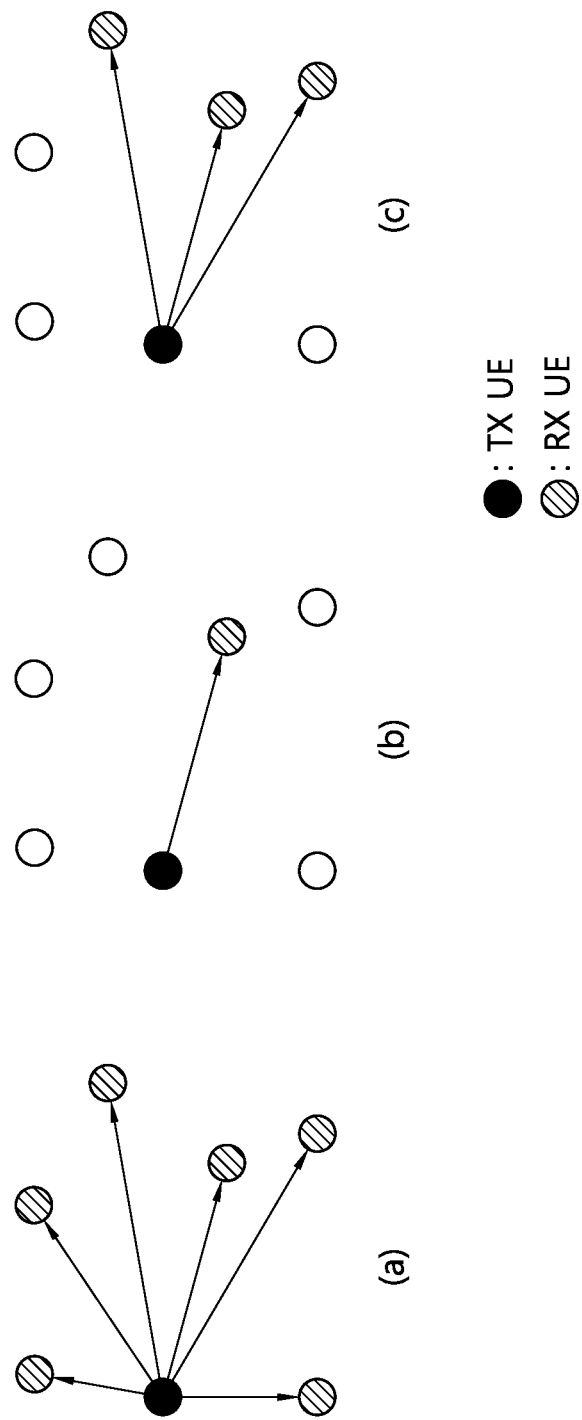
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in NR sidelink, at least from the viewpoint of transmission of a UE in carrier(s), time division multiplexing (TDM) between a PSCCH/PSSCH and a physical sidelink feedback channel (PSFCH) is allowed for transmission of PSFCH format for sidelink in slots. In addition, in unicast sidelink communication, hybrid automatic repeat request (HARQ) feedback transmission of UE(s) may be supported. In addition, in groupcast sidelink communication, HARQ feedback transmission of UE(s) may be supported. That is, in the unicast sidelink communication or the groupcast sidelink communication, a receiving UE may transmit HARQ feedback corresponding to a PSCCH and/or a PSSCH received from a transmitting UE to the transmitting UE. Furthermore, when HARQ feedback is enabled for the groupcast sidelink communication, the HARQ feedback option 1 or the HARQ feedback option 2 may be supported.

According to the HARQ feedback option 1, a receiving UE may transmit only HARQ negative acknowledgement (NACK) to a transmitting UE. That is, the receiving UE may not transmit HARQ acknowledgement (ACK) to the transmitting UE. If the HARQ feedback option 1 is used for sidelink groupcast transmission, a plurality of receiving UEs (e.g., all receiving UEs or some receiving UEs in a group) may share a PSFCH resource to transmit HARQ feedback.

On the other hand, according to the HARQ feedback option 2, a receiving UE may transmit HARQ ACK or HARQ NACK to a transmitting UE. If the HARQ feedback option 2 is used for sidelink groupcast transmission, a plurality of receiving UEs (e.g., each receiving UEs in a group) transmits HARQ ACK or HARQ NACK by using separate PSFCH resources. For example, each of PSFCH resources may be mapped to a time resource, a frequency resource, and a code resource.

In slots associated with a resource pool, PSFCH resources may be periodically (pre-)configured with a period of N slots. For example, N may be a positive integer. For example, N may be 2 or 4.

Meanwhile, in NR sidelink, a sequence-based PSFCH format having one symbol may be supported. The one symbol does not include an automatic gain control (AGC) training period. The sequence-based PSFCH format having the one symbol may be applicable to HARQ feedback in unicast. In addition, the sequence-based PSFCH format having one symbol may be applicable to HARQ feedback in groupcast including the HARQ feedback option 1 and the HARQ feedback option 2. The sequence-based PSFCH format sequence having one symbol may be generated similarly to the sequence of a PUCCH format 0.

In the case of the HARQ feedback option 1 based on TX-RX distance-based HARQ feedback for groupcast, if the TX-RX distance is less than or equal to the communication range requirement, a receiving UE may transmit HARQ feedback for a PSSCH. Otherwise, the receiving UE may not transmit HARQ feedback for the PSSCH. For example, the location of the transmitting UE may be indicated by a SCI related to the PSSCH.

Meanwhile, for PSSCH transmission in the last symbol of slot n, HARQ feedback related to the PSSCH transmission is expected to be in slot n+a. Herein, a may be the smallest integer greater than or equal to K under the condition that slot n+a includes PSFCH resource(s). In addition, if at least a PSFCH in the slot is a response to a single PSSCH, the implicit mechanism may be used to determine at least a frequency domain resource and/or a code domain resource of the PSFCH within the configured resource pool.

Meanwhile, in case a base station allocates resource(s) for sidelink transmission to a transmitting UE, if the transmitting UE that has performed sidelink transmission through the resource(s) receives HARQ feedback for the sidelink transmission from a receiving UE, the transmitting UE needs to report information on the HARQ feedback to the base station.

For example, it is assumed that a base station allocates a first PSSCH and/or a first PSCCH for initial transmission to a transmitting UE and allocates a second PSSCH and/or a second PSCCH for sidelink HARQ feedback-based retransmission to the transmitting UE. In this case, the transmitting UE may transmit sidelink information to a receiving UE through the first PSSCH and/or the first PSCCH. In the present disclosure, the sidelink information may include at least one of sidelink data, sidelink control information, a sidelink service, or a sidelink packet. Thereafter, if the transmitting UE receives HARQ NACK from the receiving UE, the transmitting UE may report information on HARQ feedback related to the HARQ NACK to the base station through a PUCCH, and the transmitting UE may retransmit the sidelink information to the receiving UE through the second PSSCH and/or the second PSCCH. Thereafter, if the transmitting UE receives HARQ NACK from the receiving UE, the transmitting UE may report information on HARQ feedback related to the HARQ NACK to the base station through a PUCCH. In this case, the base station may allocate additional sidelink transmission resource(s) to the transmitting UE.

For example, it is assumed that a base station allocates a first PSSCH and/or a first PSCCH for initial transmission to a transmitting UE and allocates a second PSSCH and/or a second PSCCH for sidelink HARQ feedback-based retransmission to the transmitting UE. In this case, the transmitting UE may transmit sidelink information to a receiving UE through the first PSSCH and/or the first PSCCH. Thereafter, if the transmitting UE receives HARQ ACK from the receiving UE, the transmitting UE may report information on HARQ feedback related to the HARQ ACK to the base station through a PUCCH. In this case, it may be unnecessary for the transmitting UE to perform sidelink HARQ feedback-based retransmission through the second PSSCH and/or the second PSCCH. Accordingly, for example, the base station may allocate resource(s) related to the second PSSCH and/or the second PSCCH to another UE or may allocate it for uplink transmission of the transmitting UE.

As described above, in the case of LTE sidelink mode 1 or mode 3 operation, or in the case of NR sidelink mode 1 operation in which a base station allocates sidelink transmission resource(s) to UE(s), it may be necessary for a transmitting UE to report information on received HARQ feedback, in order for the base station to efficiently manage sidelink resource(s). In addition, as described above, the transmitting UE may transmit information on HARQ feedback corresponding to the PSSCH and/or the PSCCH to the base station through the PUCCH. In the present disclosure, the PUCCH for the transmitting UE to transmit information on HARQ feedback corresponding to the PSSCH and/or the PSCCH to the base station may be referred to as a PUCCH for SL HARQ feedback report.

Meanwhile, a base station may transmit a PDSCH to a transmitting UE, and the transmitting UE may transmit HARQ feedback corresponding to the PDSCH to the base station through a PUCCH. In the present disclosure, the PUCCH for the transmitting UE to transmit HARQ feedback corresponding to the PDSCH to the base station may be referred to as a PUCCH for HARQ feedback. In this case, the transmitting UE needs to perform different operations according to how the base station allocates PUCCH resource(s) for SL HARQ feedback report and PUCCH resource(s) for HARQ feedback. Hereinafter, based on an embodiment of the present disclosure, a method for a transmitting UE to transmit HARQ feedback and/or SL HARQ feedback report to a base station, and an apparatus supporting the same, will be described. In the present disclosure, SL HARQ feedback report may be that the transmitting UE reports or transmits information on SL HARQ feedback received from a receiving UE to the base station.

Figure 12:
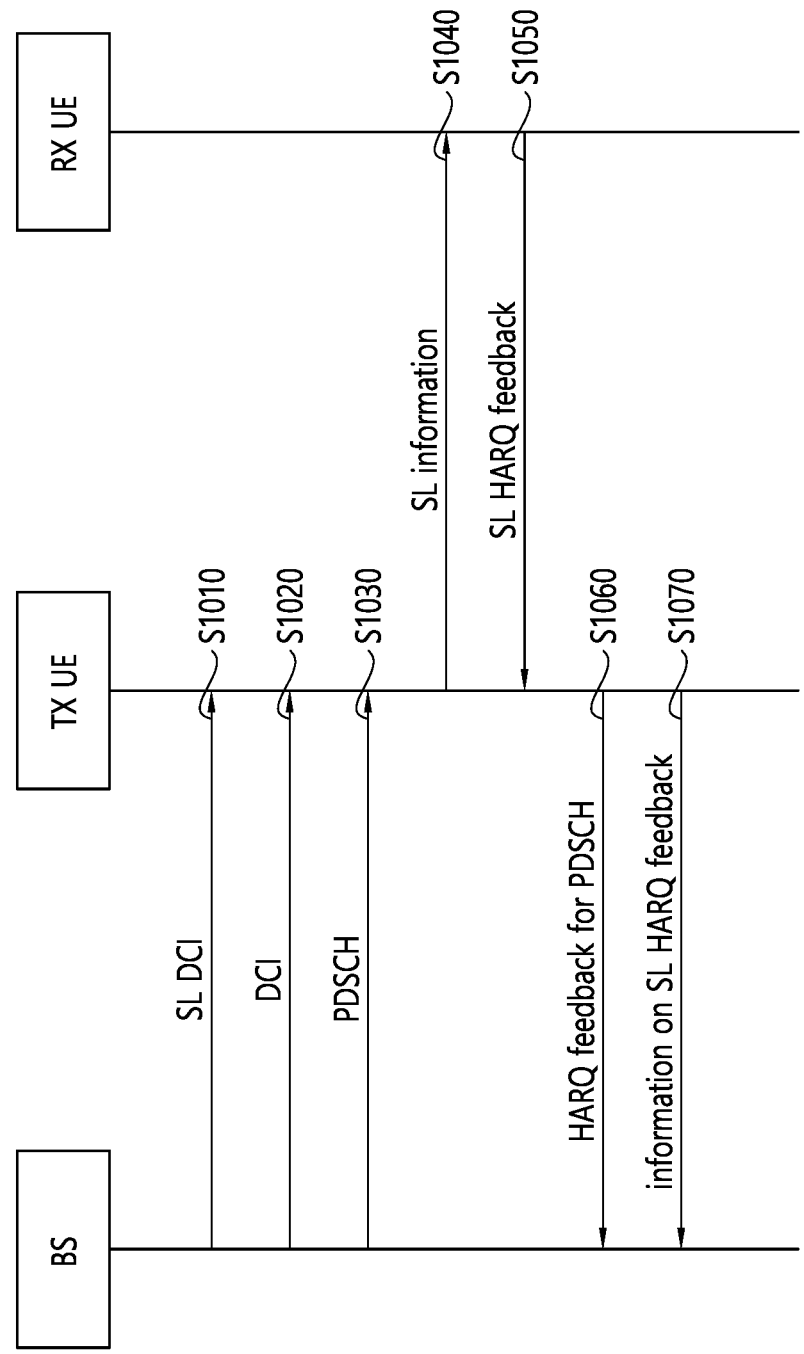
FIG. 12 shows a procedure for a transmitting UE to transmit HARQ feedback and/or information on SL HARQ feedback to a base station, based on an embodiment of the present disclosure.

FIG. 12 shows a procedure for a transmitting UE to transmit HARQ feedback and/or information on SL HARQ feedback to a base station, based on an embodiment of the present disclosure. The embodiment of FIG. 12 may be combined with various embodiments of the present disclosure.

Referring to FIG. 12, in step S1010, the base station may allocate resource(s) for the transmitting UE to report information on SL HARQ feedback to the base station to the transmitting UE. In the present disclosure, the resource for the transmitting UE to report information on SL HARQ feedback to the base station may be referred to as a SL HARQ feedback report resource. For example, the SL HARQ feedback report resource may be a PUCCH resource for SL HARQ feedback report. Hereinafter, in the present disclosure, for convenience of description, a PUCCH resource for SL HARQ feedback report may be referred to as a first PUCCH resource. For example, SL HARQ feedback report resource(s) may be allocated to the transmitting UE through a SL DCI. In the present disclosure, the SL DCI may be a DCI for scheduling sidelink transmission-related resource(s). For example, the SL DCI may include information related to SL frequency resource allocation and/or information related to SL time resource allocation.

In step S1020, the base station may allocate resource(s) for the transmitting UE to report HARQ feedback corresponding to a PDSCH to the base station to the transmitting UE. In the present disclosure, the resource for the transmitting UE to report HARQ feedback to the base station may be referred to as a HARQ feedback resource. For example, the HARQ feedback resource may be a PUCCH resource for HARQ feedback. Hereinafter, in the present disclosure, for convenience of description, the PUCCH resource for HARQ feedback may be referred to as a second PUCCH resource. For example, the HARQ feedback resource may be allocated to the transmitting UE through a DCI. For example, the DCI may include information related to DL frequency resource allocation and/or information related to DL time resource allocation.

Alternatively, based on an embodiment of the present disclosure, the base station may allocate a common PUCCH resource to the transmitting UE. In the present disclosure, the common PUCCH resource may be a PUCCH resource for the transmitting UE to transmit at least one of HARQ feedback for a PDSCH and/or information on SL HARQ feedback to the base station. In the present disclosure, for convenience of description, the common PUCCH resource may be referred to as a third PUCCH resource. For example, the third PUCCH resource may be allocated through the DCI and/or the SL DCI.

Based on an embodiment of the present disclosure, the order of steps S1010 and S1020 may be changed. For example, the base station may transmit the SL DCI to the transmitting UE and then transmit the DCI to the transmitting UE. For example, the base station may transmit the DCI to the transmitting UE and then transmit the SL DCI to the transmitting UE. For example, the base station may transmit the SL DCI and the DCI to the transmitting UE in the same time resource. For example, the same time resource may be the same slot, the same subframe, or the like.

In step S1030, the transmitting UE may receive downlink data from the base station. For example, the downlink data may be received by using a PDSCH resource.

In step S1040, the transmitting UE may transmit sidelink information to the receiving UE. For example, the transmitting UE may transmit sidelink information to the receiving UE by using a PSSCH resource and/or a PSCCH resource allocated through the SL DCI. In addition, in step S1050, the transmitting UE may receive SL HARQ feedback for the sidelink information from the receiving UE. For example, SL HARQ feedback for the sidelink information may be received through a PSFCH.

Based on an embodiment of the present disclosure, the order of steps S1030 and S1040 may be changed. For example, after the transmitting UE receives the PDSCH from the base station, the transmitting UE may transmit sidelink information to the receiving UE. For example, after the transmitting UE transmits sidelink information to the receiving UE, the transmitting UE may receive the PDSCH from the base station.

Therefore, the transmitting UE needs to transmit HARQ feedback related to the PDSCH to the base station through the HARQ feedback resource (i.e., the second PUCCH resource), and the transmitting UE needs to transmit information on SL HARQ feedback received from the receiving UE to the base station through the SL HARQ feedback report resource (i.e., the first PUCCH resource). Alternatively, the transmitting UE needs to transmit HARQ feedback related to the PDSCH and/or information on SL HARQ feedback received from the receiving UE to the base station through the common resource (i.e., the third PUCCH resource). Hereinafter, a method for the base station to allocate the first PUCCH resource, the second PUCCH resource, and/or the third PUCCH resource, and operations of the transmitting UE accordingly, will be described in detail.

1) In the Case of Allocating the First PUCCH Resource and the Second PUCCH Resource Independently Based on an embodiment of the present disclosure, the base station may independently allocate the first PUCCH resource and the second PUCCH resource to the transmitting UE.

For example, if the first PUCCH resource and the second PUCCH resource are independently allocated, the base station may independently allocate the first PUCCH resource related to one or more PSCCHs and/or one or more PSSCHs for initial transmission and the first PUCCH resource related to one or more PSCCHs and/or one or more PSSCHs for retransmission to the transmitting UE, respectively.

For example, if the first PUCCH resource and the second PUCCH resource are independently allocated, the base station may allocate only the first PUCCH resource related to one or more PSCCHs and/or one or more PSSCHs for initial transmission to the transmitting UE. In this case, in order for the transmitting UE to transmit SL HARQ feedback report related to one or more PSCCHs and/or one or more PSSCHs for retransmission to the base station, the transmitting UE may reuse a frequency domain resource of the first PUCCH resource related to the initial transmission.

Figure 13:
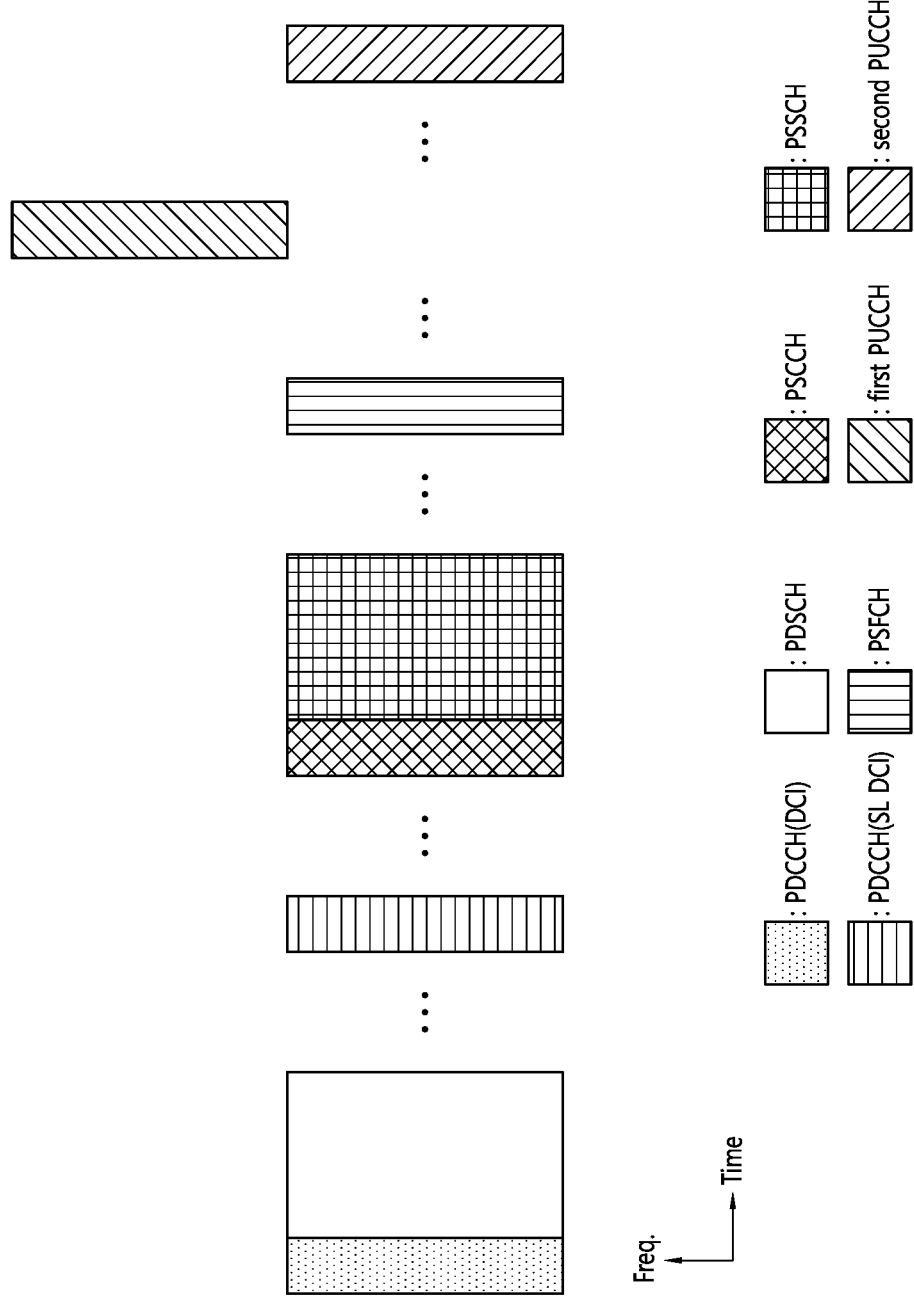
FIG. 13 shows an example in which a base station independently allocates a first PUCCH resource and a second PUCCH resource, based on an embodiment of the present disclosure.

FIG. 13 shows an example in which a base station independently allocates a first PUCCH resource and a second PUCCH resource, based on an embodiment of the present disclosure. The embodiment of FIG. 13 may be combined with various embodiments of the present disclosure.

Referring to FIGS. 12 and 13, in step S1060, the transmitting UE may transmit HARQ feedback for the PDSCH to the base station by using the second PUCCH resource. In addition, in step S1070, the transmitting UE may transmit information on SL HARQ feedback received from the receiving UE to the base station by using the first PUCCH resource.

Figure 14:
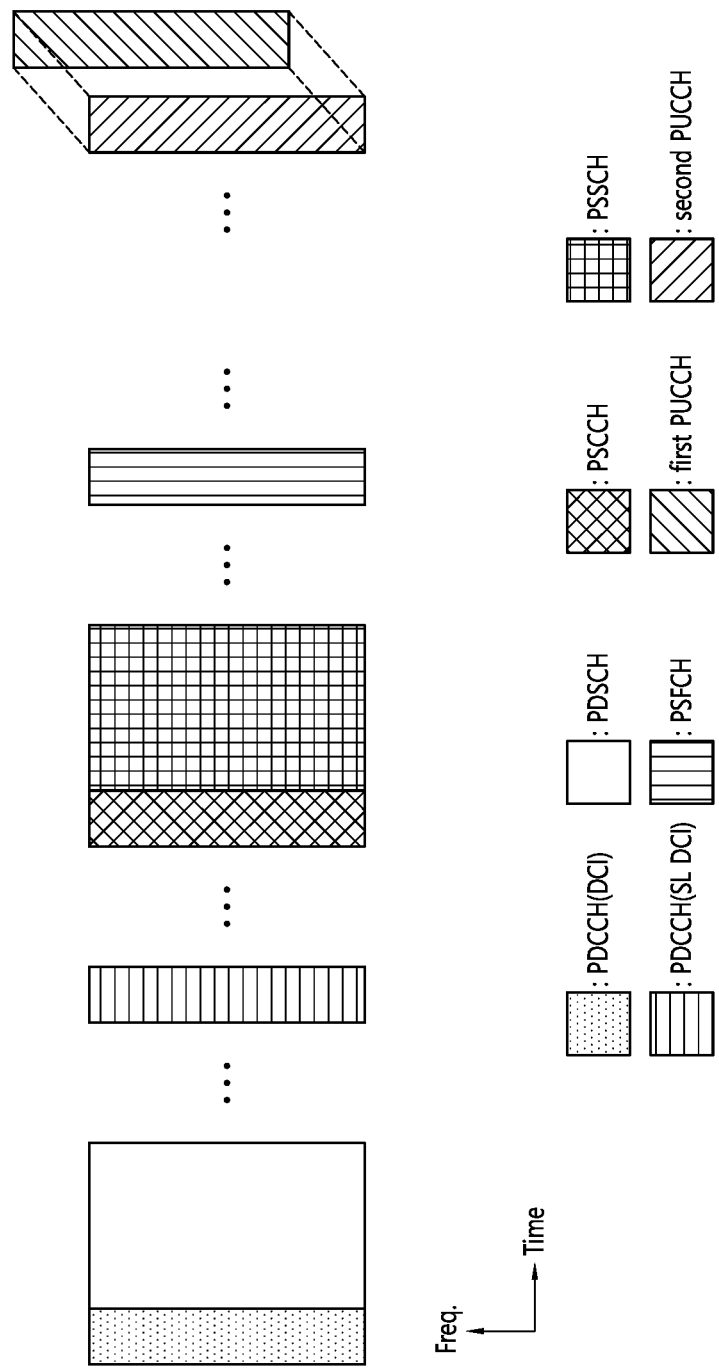
FIG. 14 shows an example in which a base station independently allocates a first PUCCH resource and a second PUCCH resource, based on an embodiment of the present disclosure.

FIG. 14 shows an example in which a base station independently allocates a first PUCCH resource and a second PUCCH resource, based on an embodiment of the present disclosure. The embodiment of FIG. 14 may be combined with various embodiments of the present disclosure.

Meanwhile, even if the base station independently allocates the first PUCCH resource and the second PUCCH resource, as in the embodiment of FIG. 14, all or part of the first PUCCH resource and the second PUCCH resource may be overlapped. In this case, the transmitting UE may not be able to transmit either HARQ feedback for the PDSCH or information on SL HARQ feedback received from the receiving UE to the base station.

Figure 15:
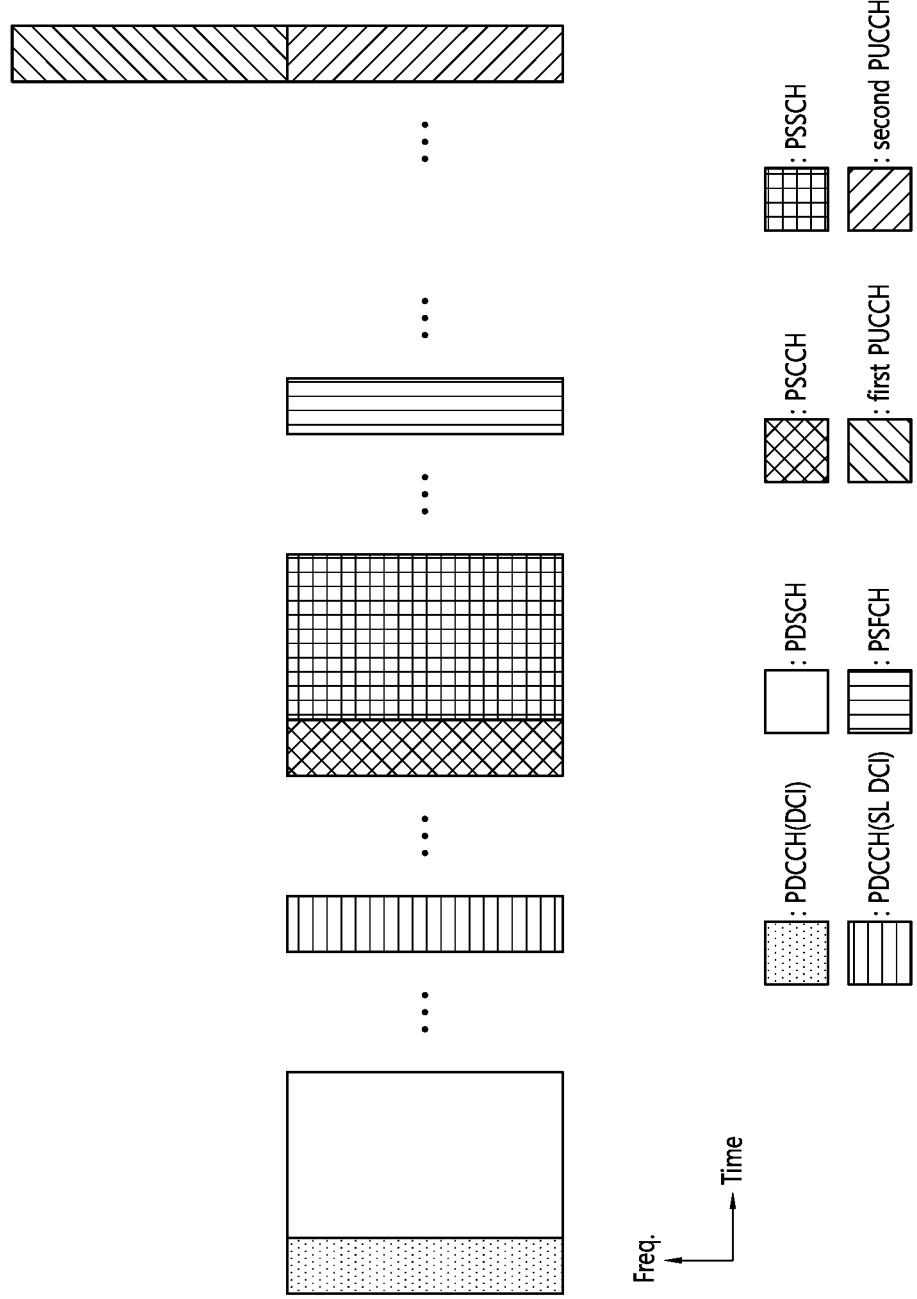
FIG. 15 shows an example in which a base station independently allocates a first PUCCH resource and a second PUCCH resource, based on an embodiment of the present disclosure.

FIG. 15 shows an example in which a base station independently allocates a first PUCCH resource and a second PUCCH resource, based on an embodiment of the present disclosure. The embodiment of FIG. 15 may be combined with various embodiments of the present disclosure.

Alternatively, even if the base station independently allocates the first PUCCH resource and the second PUCCH resource, as in the embodiment of FIG. 15, the first PUCCH resource and the second PUCCH resource may be allocated adjacently on a frequency axis. In this case, depending on the capability of the transmitting UE, the transmitting UE may not be able to transmit either HARQ feedback for the PDSCH or information on SL HARQ feedback received from the receiving UE to the base station.

In the case of the embodiment of FIG. 14 or FIG. 15, according to a rule configured or received by RRC signaling or a MAC CE, the transmitting UE may transmit one of HARQ feedback for the PDSCH or information on SL HARQ feedback to the base station based on a service priority, QoS, and/or a cast type (e.g., unicast, groupcast, or broadcast). Alternatively, according to a rule signaled by the DCI or the SL DCI, the transmitting UE may transmit one of HARQ feedback for the PDSCH or information on SL HARQ feedback to the base station based on a service priority, QoS, and/or a cast type (e.g., unicast, groupcast, or broadcast). For example, if a priority of sidelink information transmitted by the transmitting UE is higher than a pre-configured priority, the transmitting UE may transmit information on SL HARQ feedback received from the receiving UE to the base station by using the first PUCCH resource. On the other hand, the transmitting UE may not transmit HARQ feedback for the PDSCH to the base station.

Alternatively, in the case of the embodiment of FIG. 14 or FIG. 15, according to a rule configured or received by RRC signaling or a MAC CE, the transmitting UE may transmit one of HARQ feedback for the PDSCH or information on SL HARQ feedback to the base station. Alternatively, according to a rule signaled by the DCI or the SL DCI, the transmitting UE may transmit one of HARQ feedback for the PDSCH or information on SL HARQ feedback to the base station. For example, in the case of all or part of the first PUCCH resource and the second PUCCH resource being overlapped, if the base station configures the transmitting UE to transmit HARQ feedback for the PDSCH with priority over information on SL HARQ feedback, the transmitting UE may transmit HARQ feedback for the PDSCH to the base station by using the second PUCCH resource. On the other hand, the transmitting UE may not transmit information on SL HARQ feedback received from the receiving UE to the base station.

Alternatively, in the case of the embodiment of FIG. 14 or FIG. 15, according to a rule configured or received by RRC signaling or a MAC CE, the transmitting UE may piggyback HARQ feedback for the PDSCH to information on SL HARQ feedback and transmit it to the base station. Alternatively, according to a rule signaled by the DCI or the SL DCI, the transmitting UE may piggyback HARQ feedback for the PDSCH to information on SL HARQ feedback and transmit it to the base station. For example, the transmitting UE may transmit HARQ feedback for the PDSCH and information on SL HARQ feedback by using the first PUCCH resource. Alternatively, according to a rule configured or received by RRC signaling or a MAC CE, the transmitting UE may piggyback information on SL HARQ feedback to HARQ feedback for the PDSCH and transmit it to the base station. Alternatively, according to a rule signaled by the DCI or the SL DCI, the transmitting UE may piggyback information on SL HARQ feedback to HARQ feedback for the PDSCH and transmit it to the base station. For example, the transmitting UE may transmit HARQ feedback for the PDSCH and information on SL HARQ feedback by using the second PUCCH resource.

Alternatively, in the case of the embodiment of FIG. 14 or FIG. 15, the transmitting UE may add the payload of HARQ feedback for the PDSCH and the payload of information on SL HARQ feedback and transmit it to the base station. For example, the transmitting UE may transmit the sum of the payload of HARQ feedback for the PDSCH and the payload of information on SL HARQ feedback to the base station by using the first PUCCH resource or the second PUCCH resource. For example, if the sum of the payload size of HARQ feedback for the PDSCH and the payload size of information on SL HARQ feedback is less than (or equal to) a specific value or a threshold value, the first PUCCH resource or the second PUCCH resource may be a resource related to a short PUCCH format. For example, if the sum of the payload size of HARQ feedback for the PDSCH and the payload size of information on SL HARQ feedback is greater than (or equal to) a specific value or a threshold value, the first PUCCH resource or the second PUCCH resource may be a resource related to a long PUCCH format. For example, the specific value or the threshold value may be defined in the system. For example, the specific value or the threshold value may be configured or pre-configured for the UE. Table 5 shows an example of a PUCCH format.

TABLE 5

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

Referring to Table 5, for example, PUCCH formats 0 and 2 may be referred to as short PUCCH formats, and PUCCH formats 1, 3 and 4 may be referred to as long PUCCH formats. The short PUCCH and the long PUCCH may be classified based on the number of information bits and the number of allocated symbols.

Alternatively, as in the embodiment of FIG. 15, the first PUCCH resource and the second PUCCH resource may be allocated adjacently on a frequency axis, and according to the capability of the transmitting UE, the transmitting UE may transmit both HARQ feedback for the PDSCH and information on SL HARQ feedback received from the receiving UE to the base station. In this case, the transmitting UE may transmit information on SL HARQ feedback and HARQ feedback for the PDSCH to the base station by using the first PUCCH resource and the second PUCCH resource.

2) In the Case of Allocating the Third PUCCH Resource

Figure 16:
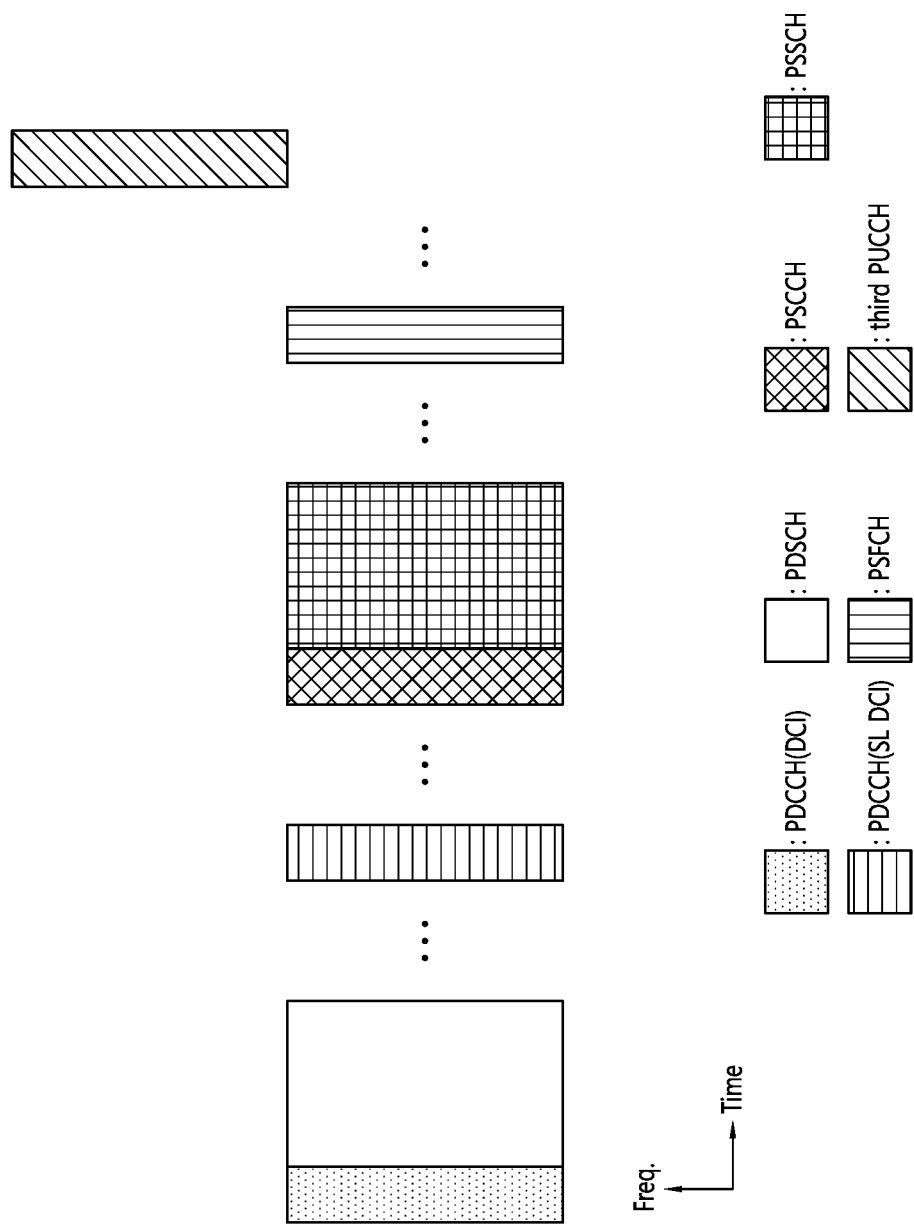
FIG. 16 shows an example in which a base station allocates a third PUCCH resource to a transmitting UE, based on an embodiment of the present disclosure.

FIG. 16 shows an example in which a base station allocates a third PUCCH resource to a transmitting UE, based on an embodiment of the present disclosure. The embodiment of FIG. 16 may be combined with various embodiments of the present disclosure.

In the case of allocating the third PUCCH resource as in the embodiment of FIG. 16, according to a rule configured or received by RRC signaling or a MAC CE, the transmitting UE may transmit one of HARQ feedback for the PDSCH or information on SL HARQ feedback to the base station based on a service priority, QoS, and/or a cast type (e.g., unicast, groupcast, or broadcast). Alternatively, according to a rule signaled by the DCI or the SL DCI, the transmitting UE may transmit one of HARQ feedback for the PDSCH or information on SL HARQ feedback to the base station based on a service priority, QoS, and/or a cast type (e.g., unicast, groupcast, or broadcast). For example, if a priority of sidelink information transmitted by the transmitting UE is higher than a pre-configured priority, the transmitting UE may transmit information on SL HARQ feedback received from the receiving UE to the base station by using the third PUCCH resource. On the other hand, the transmitting UE may not transmit HARQ feedback for the PDSCH to the base station.

Alternatively, in the case of allocating the third PUCCH, according to a rule configured or received by RRC signaling or a MAC CE, the transmitting UE may transmit one of HARQ feedback for the PDSCH or information on SL HARQ feedback to the base station. Alternatively, according to a rule signaled by the DCI or the SL DCI, the transmitting UE may transmit one of HARQ feedback for the PDSCH or information on SL HARQ feedback to the base station. For example, if the base station configures the transmitting UE to transmit HARQ feedback for the PDSCH with priority over information on SL HARQ feedback, the transmitting UE may transmit HARQ feedback for the PDSCH to the base station by using the third PUCCH resource. On the other hand, the transmitting UE may not transmit information on SL HARQ feedback received from the receiving UE to the base station.

Alternatively, in the case of allocating the third PUCCH, according to a rule configured or received by RRC signaling or a MAC CE, the transmitting UE may piggyback HARQ feedback for the PDSCH to information on SL HARQ feedback and transmit it to the base station. Alternatively, according to a rule signaled by the DCI or the SL DCI, the transmitting UE may piggyback HARQ feedback for the PDSCH to information on SL HARQ feedback and transmit it to the base station. Alternatively, according to a rule configured or received by RRC signaling or a MAC CE, the transmitting UE may piggyback information on SL HARQ feedback to HARQ feedback for the PDSCH and transmit it to the base station. Alternatively, according to a rule signaled by the DCI or the SL DCI, the transmitting UE may piggyback information on SL HARQ feedback to HARQ feedback for the PDSCH and transmit it to the base station. For example, the transmitting UE may transmit HARQ feedback for the PDSCH and information on SL HARQ feedback by using the third PUCCH resource.

Alternatively, in the case of allocating the third PUCCH, the transmitting UE may add the payload of HARQ feedback for the PDSCH and the payload of information on SL HARQ feedback and transmit it to the base station. For example, the transmitting UE may transmit the sum of the payload of HARQ feedback for the PDSCH and the payload of information on SL HARQ feedback to the base station by using the third PUCCH resource. For example, if the sum of the payload size of HARQ feedback for the PDSCH and the payload size of information on SL HARQ feedback is less than (or equal to) a specific value or a threshold value, the third PUCCH resource may be a resource related to a short PUCCH format. For example, if the sum of the size of HARQ feedback for the PDSCH and the size of information on SL HARQ feedback is greater than (or equal to) a specific value or a threshold value, the third PUCCH resource may be a resource related to a long PUCCH format. For example, the specific value or the threshold value may be defined in the system. For example, the specific value or the threshold value may be configured or pre-configured for the UE.

Alternatively, in the case of allocating the third PUCCH, the base station may determine/decide (in advance) whether a transmission time of HARQ feedback for the PDSCH of the transmitting UE is overlapped with a transmission time of information on SL HARQ feedback of the transmitting UE. Alternatively, in the case of allocating the third PUCCH, the base station may determine/decide (in advance) whether a time resource for transmitting HARQ feedback for the PDSCH by the transmitting UE and a time resource for transmitting information on SL HARQ feedback by the transmitting UE are overlapped. For example, if the base station determines/decides (in advance) that the transmission time of HARQ feedback for the PDSCH of the transmitting UE and the transmission time of information on SL HARQ feedback of the transmitting UE are overlapped, or if the base station determines/decides (in advance) that the time resource for transmitting HARQ feedback for the PDSCH by the transmitting UE and the time resource for transmitting information on SL HARQ feedback by the transmitting UE are overlapped, the base station may allocate an independent PUCCH resource (e.g., the first PUCCH resource or the second PUCCH resource) to the transmitting UE. For example, if the base station determines/decides (in advance) that the transmission time of HARQ feedback for the PDSCH of the transmitting UE and the transmission time of information on SL HARQ feedback of the transmitting UE are overlapped, or if the base station determines/decides (in advance) that the time resource for transmitting HARQ feedback for the PDSCH by the transmitting UE and the time resource for transmitting information on SL HARQ feedback by the transmitting UE are overlapped, the base station may separately allocate the first PUCCH resource to the transmitting UE. Accordingly, the transmitting UE may transmit HARQ feedback for the PDSCH to the base station by using the third PUCCH resource, and the transmitting UE may transmit information on SL HARQ feedback to the base station by using the first PUCCH resource. For example, if the base station determines/decides (in advance) that the transmission time of HARQ feedback for the PDSCH of the transmitting UE and the transmission time of information on SL HARQ feedback of the transmitting UE are overlapped, or if the base station determines/decides (in advance) that the time resource for transmitting HARQ feedback for the PDSCH by the transmitting UE and the time resource for transmitting information on SL HARQ feedback by the transmitting UE are overlapped, the base station may separately allocate the second PUCCH resource to the transmitting UE. Accordingly, the transmitting UE may transmit HARQ feedback for the PDSCH to the base station by using the second PUCCH resource, and the transmitting UE may transmit information on SL HARQ feedback to the base station by using the third PUCCH resource.

3) In the Case of Allocating the First PUCCH Resource and the Second PUCCH Resource in the Form of Multiplexing Based on an embodiment of the present disclosure, the base station may allocate a PUCCH resource to the transmitting UE so that HARQ feedback for the PDSCH and information on SL HARQ feedback is transmitted by being multiplexed.

For example, according to the payload size of HARQ feedback for the PDSCH and/or the payload size of information on SL HARQ feedback, the transmitting UE may transmit HARQ feedback for the PDSCH and information on SL HARQ feedback to the base station by using a short PUCCH resource or a long PUCCH resource. For example, if the sum of the payload size of HARQ feedback for the PDSCH and the payload size of information on SL HARQ feedback is less than (or equal to) a specific value or a threshold value, the transmitting UE may add the payload of HARQ feedback for the PDSCH and the payload of information on SL HARQ feedback and transmit it to the base station by using a short PUCCH resource. For example, if the sum of the payload size of HARQ feedback for the PDSCH and the payload size of information on SL HARQ feedback is greater than (or equal to) a specific value or a threshold value, the transmitting UE may add the payload of HARQ feedback for the PDSCH and the payload of information on SL HARQ feedback and transmit it to the base station by using a long PUCCH resource. For example, the specific value or the threshold value may be defined in the system. For example, the specific value or the threshold value may be configured or pre-configured for the UE.

For example, the base station may allocate the first PUCCH resource and the second PUCCH resource to be adjacent on a frequency axis. In this case, the first PUCCH resource and the second PUCCH resource may be allocated in the form of frequency division multiplexing (FDM). Accordingly, the transmitting UE may transmit HARQ feedback for the PDSCH to the base station by using the second PUCCH resource, and the transmitting UE may transmit information on SL HARQ feedback to the base station by using the first PUCCH resource.

Meanwhile, the base station may transmit a plurality of PDSCHs to the transmitting UE within one slot, and the UE may transmit HARQ feedback for each PDSCH to the base station by using a bitmap. In this case, the bitmap may include bit fields corresponding to HARQ feedback for each PDSCH. For example, if a value of the bit field included in the bitmap is 1, ACK for a PDSCH may be indicated, and if 0, NACK for a PDSCH may be indicated.

For example, if the UE transmits HARQ feedback for each PDSCH to the base station by using the bitmap, according to a rule configured or received by RRC signaling or a MAC CE, the transmitting UE may allocate or use a specific bit field of the bitmap for SL HARQ feedback report. Alternatively, according to a rule signaled by the DCI or the SL DCI, the transmitting UE may allocate or use a specific bit field of the bitmap for SL HARQ feedback report. Accordingly, the transmitting UE may report information on SL HARQ feedback received from the receiving UE to the base station by using a specific bit field of the bitmap. For example, if a value of the specific bit field is 1, information on SL HARQ ACK may be indicated, and if a value of the specific field is 0, information on SL HARQ NACK may be indicated. Alternatively, for example, if a value of the specific bit field is 0 or 1, only information on SL HARQ NACK may be indicated. For example, a value of the specific bit field may be determined as a different bit value for each slot based on a slot index. For example, a value of the specific bit field may be reset to a value of 0 at the start of the frame, and the value of the specific bit field may be sequentially determined when a corresponding event occurs based on a bitmap counter that increases by 1 for every slot in the frame.

Alternatively, for example, in case the UE transmits HARQ feedback for each PDSCH to the base station by using the bitmap, according to a rule configured or received by RRC signaling or a MAC CE, the transmitting UE may transmit one of HARQ feedback for each PDSCH or information on SL HARQ feedback to the base station based on a service priority, QoS and/or a cast type (e.g., unicast, groupcast or broadcast). Alternatively, according to a rule signaled by the DCI or the SL DCI, the transmitting UE may transmit one of HARQ feedback for each PDSCH or information on SL HARQ feedback to the base station based on a service priority, QoS and/or a cast type (e.g., unicast, groupcast or broadcast). For example, if a priority of sidelink information transmitted by the transmitting UE is higher than a pre-configured priority, the transmitting UE may transmit information on SL HARQ feedback received from the receiving UE to the base station by using the first PUCCH resource. On the other hand, the transmitting UE may not transmit HARQ feedback for the PDSCH to the base station.

Alternatively, for example, in case the UE transmits HARQ feedback for each PDSCH to the base station by using the bitmap, according to a rule configured or received by RRC signaling or a MAC CE, the transmitting UE may transmit one of HARQ feedback for each PDSCH or information on SL HARQ feedback to the base station. Alternatively, according to a rule signaled by the DCI or the SL DCI, the transmitting UE may transmit one of HARQ feedback for each PDSCH or information on SL HARQ feedback to the base station. For example, if the base station configures the transmitting UE to transmit HARQ feedback for each PDSCH with priority over information on SL HARQ feedback, the transmitting UE may transmit HARQ feedback for each PDSCH to the base station by using the second PUCCH resource. On the other hand, the transmitting UE may not transmit information on SL HARQ feedback received from the receiving UE to the base station.

Figure 17:
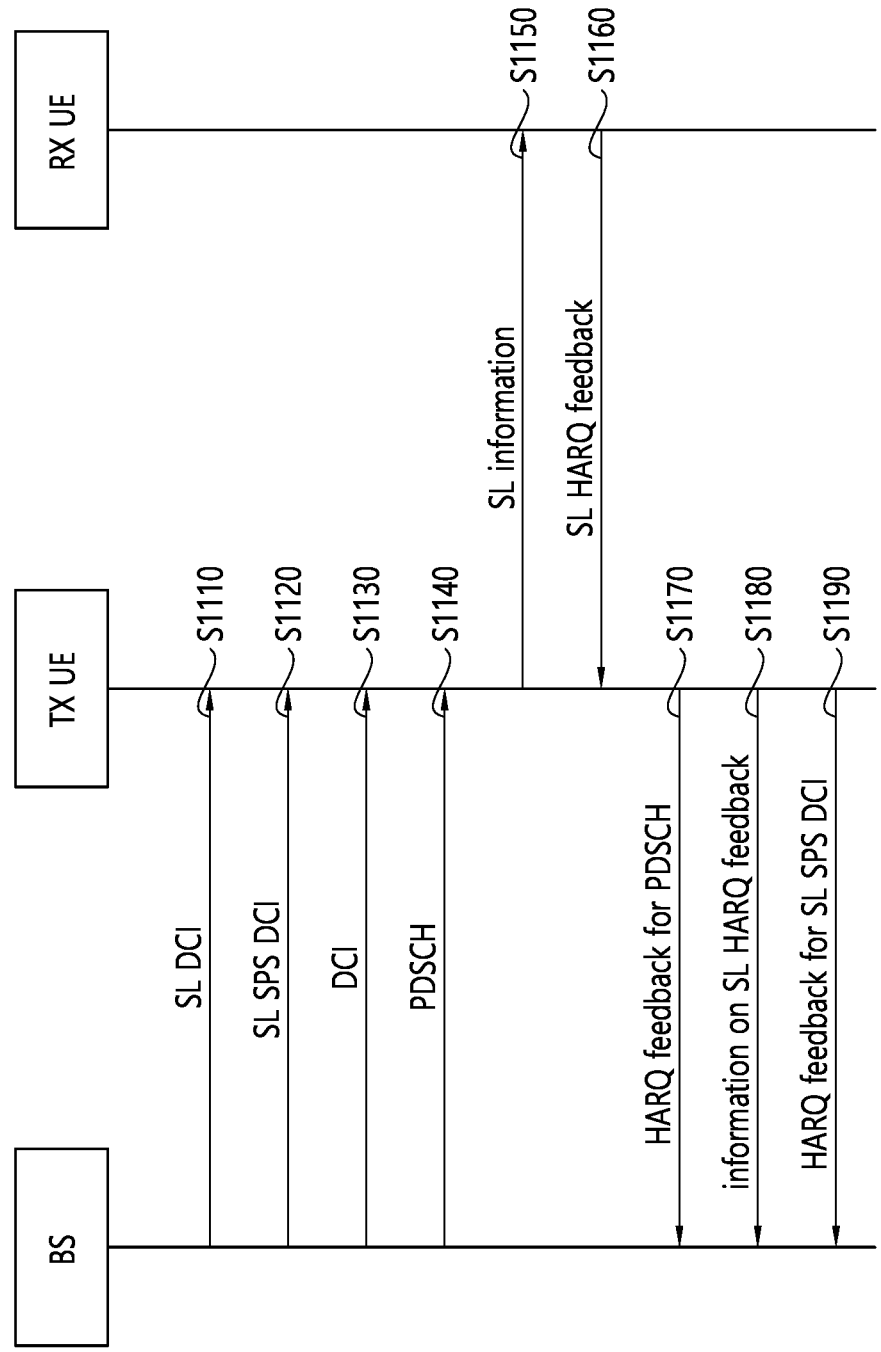
FIG. 17 shows a procedure in which a transmitting UE transmits HARQ feedback, information on SL HARQ feedback, and/or HARQ feedback for a SL SPS DCI to a base station, based on an embodiment of the present disclosure.

FIG. 17 shows a procedure in which a transmitting UE transmits HARQ feedback, information on SL HARQ feedback, and/or HARQ feedback for a SL SPS DCI to a base station, based on an embodiment of the present disclosure. The embodiment of FIG. 17 may be combined with various embodiments of the present disclosure.

Referring to FIG. 17, in step S1110, the base station may allocate the first PUCCH resource to the transmitting UE. For example, the first PUCCH resource may be allocated to the transmitting UE through the SL DCI.

In step S1120, the base station may allocate a resource for the transmitting UE to transmit confirmation HARQ feedback corresponding to the SL SPS DCI to the transmitting UE. In the present disclosure, for convenience of description, the resource for the transmitting UE to transmit confirmation HARQ feedback corresponding to the SL SPS DCI may be referred to as a fourth PUCCH resource. For example, the fourth PUCCH resource may be allocated to the transmitting UE through the SL SPS DCI. In the present disclosure, the SL SPS DCI may be a DCI for activating or releasing sidelink transmission-related semi-persistent scheduling (SPS), sidelink transmission-related SPS resources or configured SL grant resources. Alternatively, SL HARQ feedback report for sidelink information periodically transmitted through SL SPS resources may be transmitted through the first PUCCH resource. In the present disclosure, HARQ feedback report related to the SL DCI and HARQ feedback report related to the SL SPS DCI may be referred to as SL HARQ feedback report.

In step S1130, the base station may allocate the second PUCCH resource to the transmitting UE. For example, the second PUCCH resource may be allocated to the transmitting UE through the DCI.

Alternatively, based on an embodiment of the present disclosure, the base station may allocate the common PUCCH resource to the transmitting UE. In the present disclosure, the common PUCCH resource may be a PUCCH resource for the transmitting UE to transmit at least one of HARQ feedback for the PDSCH, confirmation HARQ feedback for the SL SPS DCI, and/or information on SL HARQ feedback to the base station. In the present disclosure, for convenience of description, the common PUCCH resource may be referred to as a third PUCCH resource. For example, the third PUCCH resource may be allocated through the DCI, the SL SPS DCI and/or the SL DCI.

Based on an embodiment of the present disclosure, the order of steps S1110 to S1130 may be changed.

In step S1140, the transmitting UE may receive downlink data from the base station. For example, the downlink data may be received by using a PDSCH resource.

In step S1150, the transmitting UE may transmit sidelink information to the receiving UE. For example, the transmitting UE may transmit sidelink information to the receiving UE by using a PSSCH resource and/or a PSCCH resource allocated through the SL DCI and/or the SL SPS DCI. In addition, in step S1160, the transmitting UE may receive SL HARQ feedback for the sidelink information from the receiving UE. For example, SL HARQ feedback for the sidelink information may be received through a PSFCH. Based on an embodiment of the present disclosure, the order of steps S1140 and S1150 may be changed.

Therefore, the transmitting UE needs to transmit HARQ feedback related to the PDSCH to the base station by using the second PUCCH resource, and the transmitting UE needs to transmit information on SL HARQ feedback received from the receiving UE to the base station by using the first PUCCH resource. Additionally, in case confirmation HARQ feedback for the SL SPS DCI is transmitted by using a PUCCH resource, the transmitting UE needs to transmit confirmation HARQ feedback related to the SL SPS DCI to the base station by using the fourth PUCCH resource. Alternatively, the transmitting UE needs to transmit HARQ feedback related to the PDSCH, confirmation HARQ feedback related to the SL SPS DCI, and/or information on SL HARQ feedback received from the receiving UE to the base station through the common resource (i.e., the third PUCCH resource). Hereinafter, a method for the base station to allocate the first PUCCH resource, the second PUCCH, the third PUCCH resource, and/or the fourth PUCCH resource, and operations of the transmitting UE accordingly, will be described in detail. Hereinafter, in an embodiment of the present disclosure, it is assumed that confirmation HARQ feedback related to the SL SPS DCI is transmitted based on a PUCCH resource.

1) In the Case of Allocating the First PUCCH Resource, the Second PUCCH Resource and the Fourth PUCCH Resource Independently Based on an embodiment of the present disclosure, the base station may independently allocate the first PUCCH resource, the second PUCCH resource, and the fourth PUCCH resource to the transmitting UE.

For example, if the first PUCCH resource, the second PUCCH resource, and the fourth PUCCH resource are independently allocated, the base station may independently allocate the first PUCCH resource related to one or more PSCCHs and/or one or more PSSCHs for initial transmission and the first PUCCH resource related to one or more PSCCHs and/or one or more PSSCHs for retransmission to the transmitting UE, respectively.

For example, if the first PUCCH resource, the second PUCCH resource, and the fourth PUCCH resource are independently allocated, the base station may allocate only the first PUCCH resource related to one or more PSCCHs and/or one or more PSSCHs for initial transmission to the transmitting UE. In this case, in order for the transmitting UE to transmit SL HARQ feedback report related to one or more PSCCHs and/or one or more PSSCHs for retransmission to the base station, the transmitting UE may reuse a frequency domain resource of the first PUCCH resource related to the initial transmission.

Figure 18:
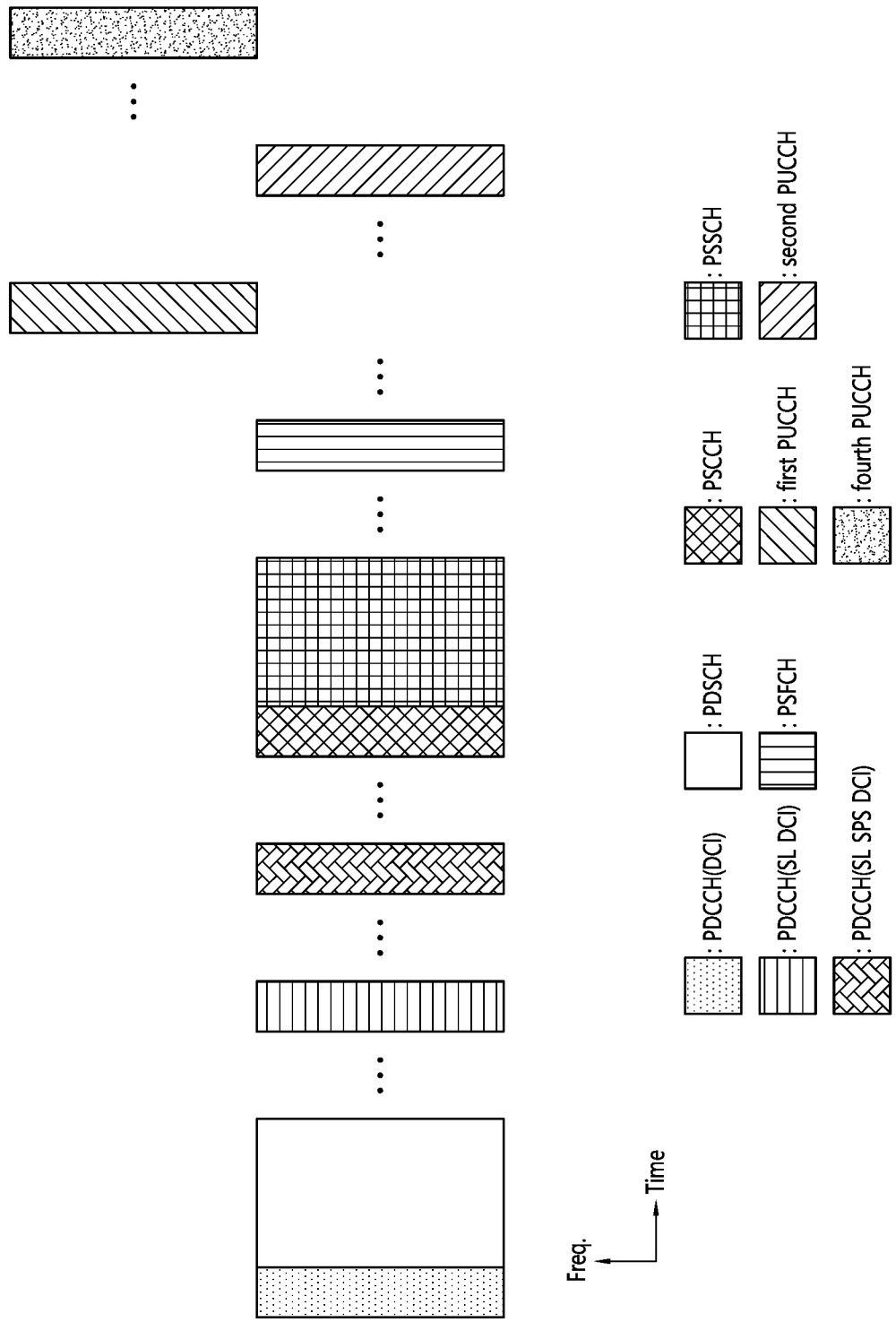
FIG. 18 shows an example in which a base station independently allocates a first PUCCH resource, a second PUCCH resource, and a fourth PUCCH resource, based on an embodiment of the present disclosure.

FIG. 18 shows an example in which a base station independently allocates a first PUCCH resource, a second PUCCH resource, and a fourth PUCCH resource, based on an embodiment of the present disclosure. The embodiment of FIG. 18 may be combined with various embodiments of the present disclosure.

Referring to FIGS. 17 and 18, in step S1170, the transmitting UE may transmit HARQ feedback for the PDSCH to the base station by using the second PUCCH resource. In addition, in step S1180, the transmitting UE may transmit information on SL HARQ feedback received from the receiving UE to the base station by using the first PUCCH resource. In addition, in step S1190, the transmitting UE may transmit confirmation HARQ feedback for the SL SPS DCI to the base station by using the fourth PUCCH resource.

Figure 19:
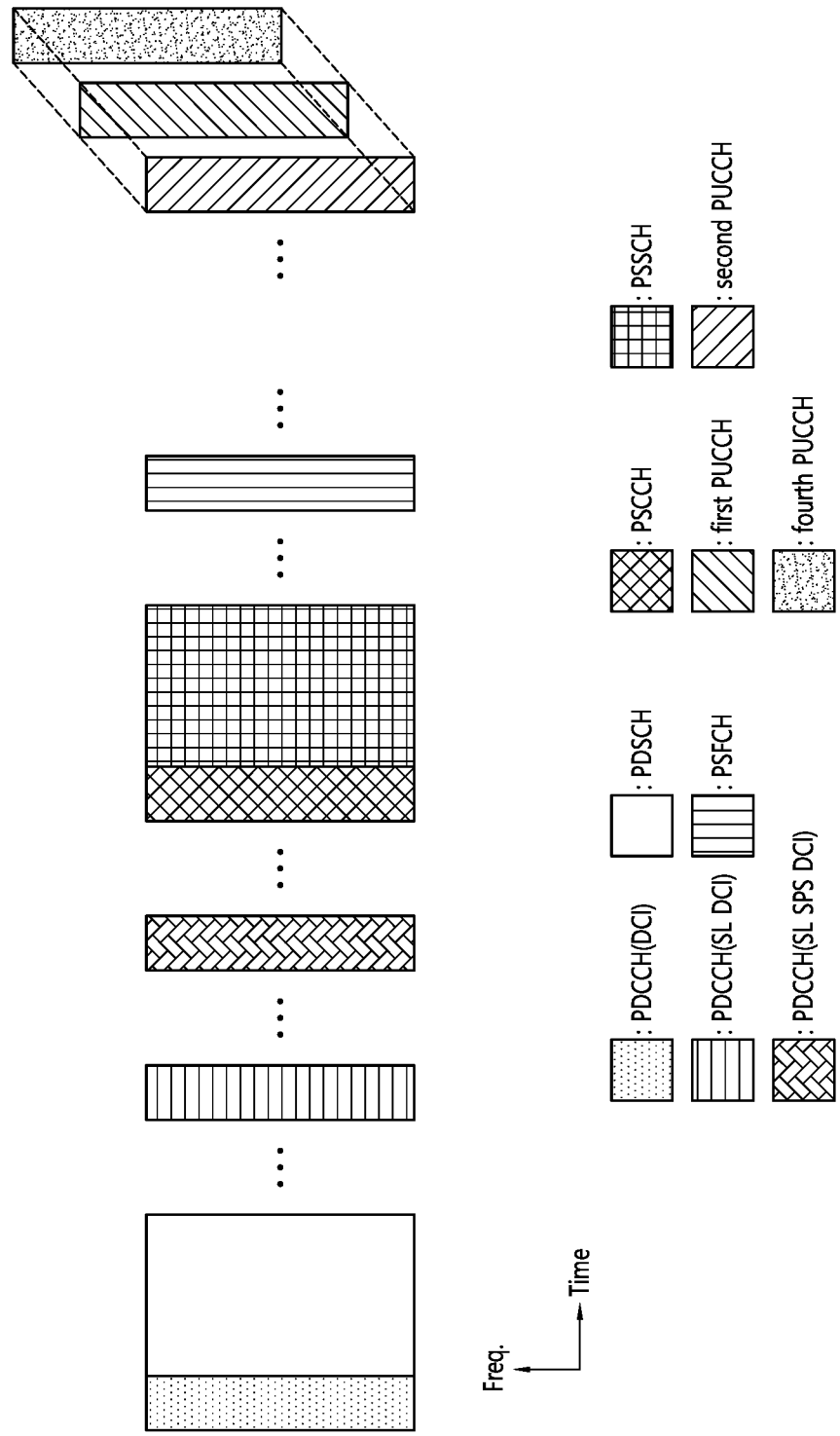
FIG. 19 shows an example in which a base station independently allocates a first PUCCH resource, a second PUCCH resource, and a fourth PUCCH resource, based on an embodiment of the present disclosure.

FIG. 19 shows an example in which a base station independently allocates a first PUCCH resource, a second PUCCH resource, and a fourth PUCCH resource, based on an embodiment of the present disclosure. The embodiment of FIG. 19 may be combined with various embodiments of the present disclosure.

Meanwhile, even if the base station independently allocates the first PUCCH resource, the second PUCCH resource, and the fourth PUCCH resource, as in the embodiment of FIG. 19, all or part of the first PUCCH resource, the second PUCCH resource, or the fourth PUCCH may be overlapped. In this case, the transmitting UE may not be able to transmit at least one of HARQ feedback for the PDSCH, confirmation HARQ feedback for the SL SPS DCI, and/or information on SL HARQ feedback received from the receiving UE to the base station.

Figure 20:
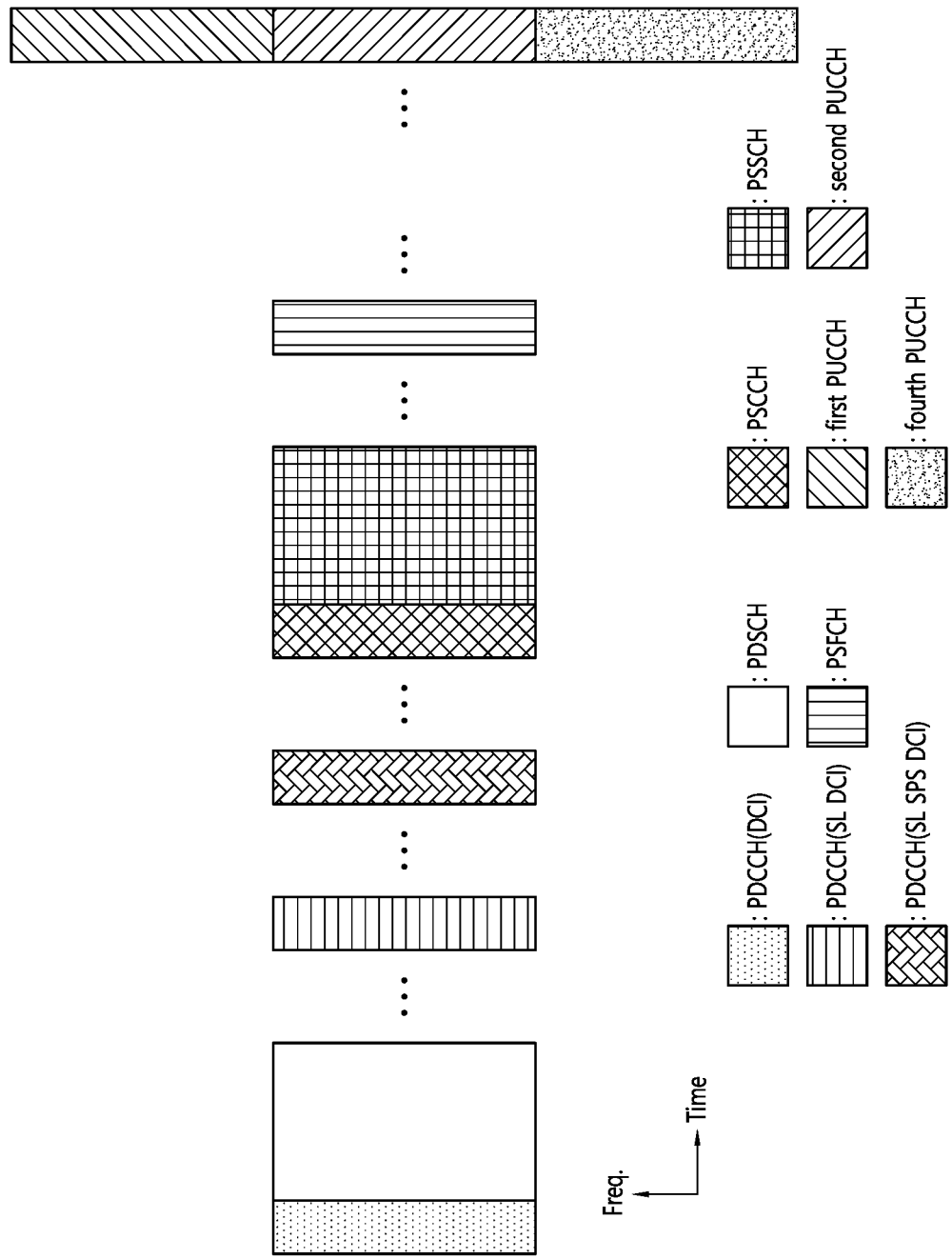
FIG. 20 shows an example in which a base station independently allocates a first PUCCH resource, a second PUCCH resource, and a fourth PUCCH resource, based on an embodiment of the present disclosure.

FIG. 20 shows an example in which a base station independently allocates a first PUCCH resource, a second PUCCH resource, and a fourth PUCCH resource, based on an embodiment of the present disclosure. The embodiment of FIG. 20 may be combined with various embodiments of the present disclosure.

Alternatively, even if the base station independently allocates the first PUCCH resource, the second PUCCH resource, and the fourth PUCCH resource, as in the embodiment of FIG. 20, the first PUCCH resource, the second PUCCH resource, and the fourth PUCCH resource may be allocated adjacently on a frequency axis. In this case, depending on the capability of the transmitting UE, the transmitting UE may not be able to transmit at least one of HARQ feedback for the PDSCH, confirmation HARQ feedback for the SL SPS DCI, and/or information on SL HARQ feedback received from the receiving UE to the base station.

In the case of the embodiment of FIG. 19 or FIG. 20, according to a rule configured or received by RRC signaling or a MAC CE, the transmitting UE may transmit at least one of HARQ feedback for the PDSCH, confirmation HARQ feedback for the SL SPS DCI, and/or information on SL HARQ feedback to the base station, based on a service priority, QoS and/or a cast type (e.g., unicast, groupcast or broadcast). Alternatively, according to a rule signaled by the DCI or the SL DCI, the transmitting UE may transmit at least one of HARQ feedback for the PDSCH, confirmation HARQ feedback for the SL SPS DCI, and/or information on SL HARQ feedback to the base station, based on a service priority, QoS and/or a cast type (e.g., unicast, groupcast or broadcast). For example, if a priority of sidelink information transmitted by the transmitting UE is higher than a pre-configured priority, the transmitting UE may transmit information on SL HARQ feedback received from the receiving UE to the base station by using the first PUCCH resource. On the other hand, the transmitting UE may not transmit HARQ feedback for the PDSCH and confirmation HARQ feedback for the SL SPS DCI to the base station.

Alternatively, in the case of the embodiment of FIG. 19 or FIG. 20, according to a rule configured or received by RRC signaling or a MAC CE, the transmitting UE may transmit at least one of HARQ feedback for the PDSCH, confirmation HARQ feedback for the SL SPS DCI, and/or information on SL HARQ feedback to the base station. Alternatively, according to a rule signaled by the DCI or the SL DCI, the transmitting UE may transmit at least one of HARQ feedback for the PDSCH, confirmation HARQ feedback for the SL SPS DCI, and/or information on SL HARQ feedback to the base station. For example, in the case of all or part of the first PUCCH resource, the second PUCCH resource, and/or the fourth PUCCH resource being overlapped, if the base station configures the transmitting UE to transmit HARQ feedback for the PDSCH with priority over confirmation HARQ feedback for the SL SPS DCI and information on SL HARQ feedback, the transmitting UE may transmit HARQ feedback for the PDSCH to the base station by using the second PUCCH resource. On the other hand, the transmitting UE may not transmit information on SL HARQ feedback received from the receiving UE and confirmation HARQ feedback for the SL SPS DCI to the base station.

Alternatively, in the case of the embodiment of FIG. 19 or FIG. 20, according to a rule configured or received by RRC signaling or MAC CE, the transmitting UE may piggyback HARQ feedback for the PDSCH and/or confirmation HARQ feedback for the SL SPS DCI to information on SL HARQ feedback and transmit it to the base station. Alternatively, according to a rule signaled by the DCI or the SL DCI, the transmitting UE may piggyback HARQ feedback for the PDSCH and/or confirmation HARQ feedback for the SL SPS DCI to information on SL HARQ feedback and transmit it to the base station. For example, the transmitting UE may transmit HARQ feedback for the PDSCH and/or confirmation HARQ feedback for the SL SPS DCI together with information on SL HARQ feedback by using the first PUCCH resource.

Alternatively, according to a rule configured or received by RRC signaling or a MAC CE, the transmitting UE may piggyback information on SL HARQ feedback and/or confirmation HARQ feedback for the SL SPS DCI to HARQ feedback for the PDSCH and transmit it to the base station. Alternatively, according to a rule signaled by the DCI or the SL DCI, the transmitting UE may piggyback information on SL HARQ feedback and/or confirmation HARQ feedback for the SL SPS DCI to HARQ feedback for the PDSCH and transmit it to the base station. For example, the transmitting UE may transmit confirmation HARQ feedback for the SL SPS DCI and/or information on SL HARQ feedback together with HARQ feedback for the PDSCH by using the second PUCCH resource.

Alternatively, according to a rule configured or received by RRC signaling or a MAC CE, the transmitting UE may piggyback information on SL HARQ feedback and/or HARQ feedback for the PDSCH to confirmation HARQ feedback for the SL SPS DCI and transmit it to the base station. Alternatively, according to a rule signaled by the DCI or the SL DCI, the transmitting UE may piggyback information on SL HARQ feedback and/or HARQ feedback for the PDSCH to confirmation HARQ feedback for the SL SPS DCI and transmit it to the base station. For example, the transmitting UE may transmit HARQ feedback for the PDSCH and/or information on SL HARQ feedback together with confirmation HARQ feedback for the SL SPS DCI by using the fourth PUCCH resource.

Alternatively, in the case of the embodiment of FIG. 19 or FIG. 20, the transmitting UE may transmit the sum of the payload of HARQ feedback for the PDSCH, the payload of information on SL HARQ feedback, and/or the payload of confirmation HARQ feedback for the SL SPS DCI to the base station. For example, the transmitting UE may transmit the sum of the payload of HARQ feedback for the PDSCH, the payload of information on SL HARQ feedback, and the payload of confirmation HARQ feedback for the SL SPS DCI to the base station by using the first PUCCH resource, the second PUCCH resource, or the fourth PUCCH resource. For example, if the sum of the payload sizes is less than (or equal to) a specific value or a threshold value, the first PUCCH resource, the second PUCCH, or the fourth PUCCH resource may be a resource related to a short PUCCH format. For example, if the sum of the payload sizes is greater than (or equal to) a specific value or a threshold value, the first PUCCH resource, the second PUCCH, or the fourth PUCCH resource may be a resource related to a long PUCCH format.

Alternatively, as in the embodiment of FIG. 20, the first PUCCH resource, the second PUCCH resource, and the fourth PUCCH resource may be allocated adjacently on a frequency axis, and according to the capability of the transmitting UE, the transmitting UE can transmit all of HARQ feedback for the PDSCH, confirmation HARQ feedback for the SL SPS DCI, and information on SL HARQ feedback received from the receiving UE to the base station. In this case, the transmitting UE may transmit information on SL HARQ feedback, HARQ feedback for the PDSCH, and confirmation HARQ feedback for the SL SPS DCI to the base station, by using the first PUCCH resource, the second PUCCH resource, and the fourth PUCCH resource.

2) In the Case of Allocating the Third PUCCH Resource

Figure 21:
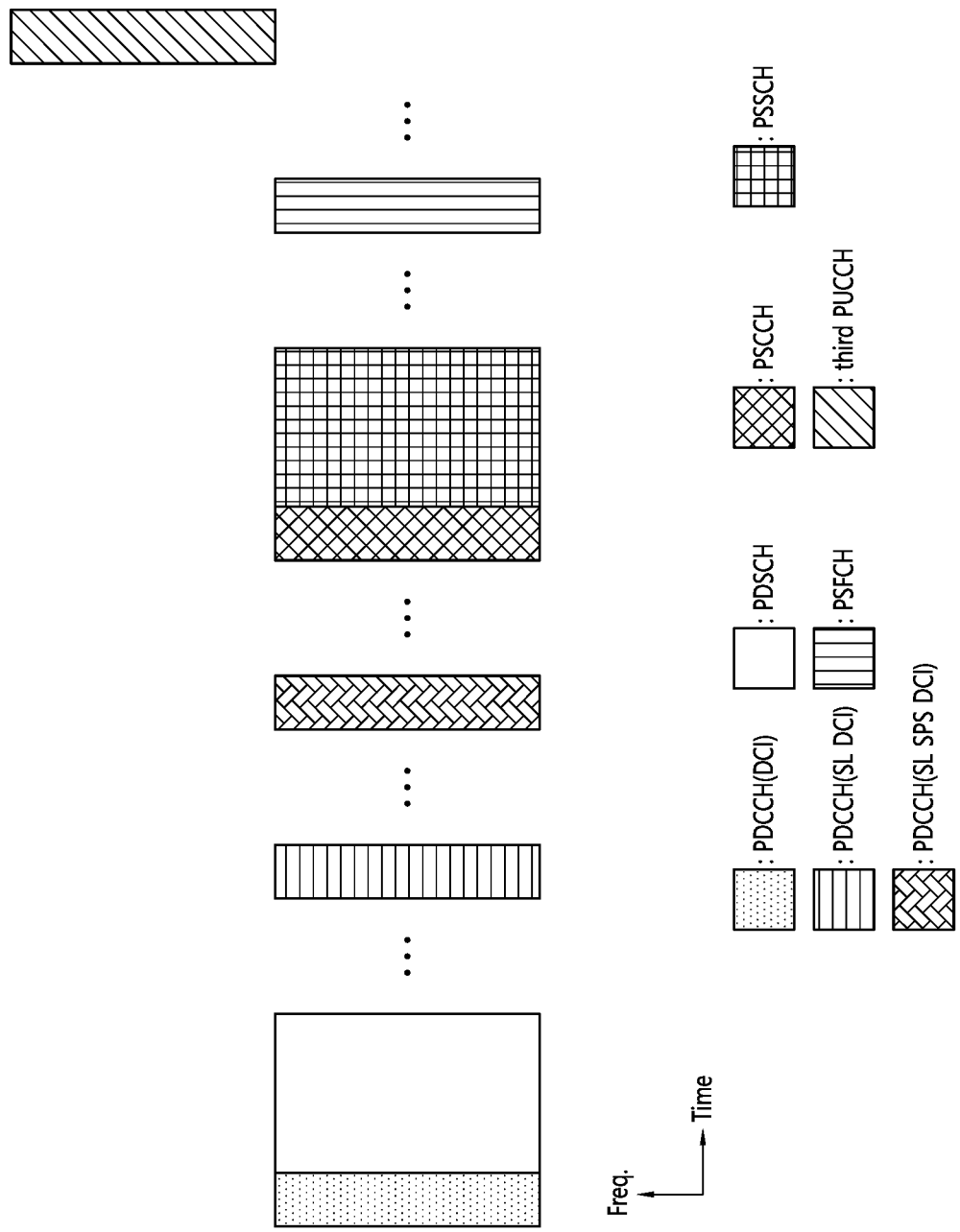
FIG. 21 shows an example in which a base station allocates a third PUCCH resource to a transmitting UE, based on an embodiment of the present disclosure.

FIG. 21 shows an example in which a base station allocates a third PUCCH resource to a transmitting UE, based on an embodiment of the present disclosure. The embodiment of FIG. 21 may be combined with various embodiments of the present disclosure.

In the case of allocating the third PUCCH resource as in the embodiment of FIG. 21, according to a rule configured or received by RRC signaling or a MAC CE, the transmitting UE may transmit at least one of HARQ feedback for the PDSCH, confirmation HARQ feedback for the SL SPS DCI, and/or information on SL HARQ feedback to the base station, based on a service priority, QoS and/or a cast type (e.g., unicast, groupcast or broadcast). Alternatively, according to a rule signaled by the DCI or the SL DCI, the transmitting UE may transmit at least one of HARQ feedback for the PDSCH, confirmation HARQ feedback for the SL SPS DCI, and/or information on SL HARQ feedback to the base station, based on a service priority, QoS and/or a cast type (e.g., unicast, groupcast or broadcast). For example, if a priority of sidelink information transmitted by the transmitting UE is higher than a pre-configured priority, the transmitting UE may transmit information on SL HARQ feedback received from the receiving UE to the base station by using the third PUCCH resource. On the other hand, the transmitting UE may not transmit HARQ feedback for the PDSCH and confirmation HARQ feedback for the SL SPS DCI to the base station.

Alternatively, in the case of allocating the third PUCCH resource, according to a rule configured or received by RRC signaling or a MAC CE, the transmitting UE may transmit at least one of HARQ feedback for the PDSCH, confirmation HARQ feedback for the SL SPS DCI, and/or information on SL HARQ feedback to the base station. Alternatively, according to a rule signaled by the DCI or the SL DCI, the transmitting UE may transmit at least one of HARQ feedback for the PDSCH, confirmation HARQ feedback for the SL SPS DCI, and/or information on SL HARQ feedback to the base station. For example, if the base station configures the transmitting UE to transmit HARQ feedback for the PDSCH with priority over confirmation HARQ feedback for the SL SPS DCI and information on SL HARQ feedback, the transmitting UE may transmit HARQ feedback for the PDSCH to the base station by using the third PUCCH resource. On the other hand, the transmitting UE may not transmit information on SL HARQ feedback received from the receiving UE and confirmation HARQ feedback for the SL SPS DCI to the base station.

Alternatively, in the case of allocating the third PUCCH resource, according to a rule configured or received by RRC signaling or a MAC CE, the transmitting UE may piggyback HARQ feedback for the PDSCH and/or confirmation HARQ feedback for the SL SPS DCI to information on SL HARQ feedback and transmit it to the base station. Alternatively, according to a rule signaled by the DCI or the SL DCI, the transmitting UE may piggyback HARQ feedback for the PDSCH and/or confirmation HARQ feedback for the SL SPS DCI to information on SL HARQ feedback and transmit it to the base station. For example, the transmitting UE may transmit HARQ feedback for the PDSCH and/or confirmation HARQ feedback for the SL SPS DCI together with information on SL HARQ feedback by using the third PUCCH resource.

Alternatively, in the case of allocating the third PUCCH resource, according to a rule configured or received by RRC signaling or a MAC CE, the transmitting UE may piggyback information on SL HARQ feedback and/or confirmation HARQ feedback for the SL SPS DCI to HARQ feedback for the PDSCH and transmit it to the base station. Alternatively, according to a rule signaled by the DCI or the SL DCI, the transmitting UE may piggyback information on SL HARQ feedback and/or confirmation HARQ feedback for the SL SPS DCI to HARQ feedback for the PDSCH and transmit it to the base station. For example, the transmitting UE may transmit confirmation HARQ feedback for the SL SPS DCI and/or information on SL HARQ feedback together with HARQ feedback for the PDSCH by using the third PUCCH resource.

Alternatively, in the case of allocating the third PUCCH resource, according to a rule configured or received by RRC signaling or a MAC CE, the transmitting UE may piggyback information on SL HARQ feedback and/or HARQ feedback for the PDSCH to confirmation HARQ feedback for the SL SPS DCI and transmit it to the base station. Alternatively, according to a rule signaled by the DCI or the SL DCI, the transmitting UE may piggyback information on SL HARQ feedback and/or HARQ feedback for the PDSCH to confirmation HARQ feedback for the SL SPS DCI and transmit it to the base station. For example, the transmitting UE may transmit information on SL HARQ feedback and/or HARQ feedback for the PDSCH together with confirmation HARQ feedback for the SL SPS DCI by using the third PUCCH resource.

Alternatively, in the case of allocating the third PUCCH resource, the transmitting UE may add the payload of HARQ feedback for the PDSCH, the payload of information on SL HARQ feedback, and/or the payload of confirmation HARQ feedback for the SL SPS DCI and transmit it to the base station. For example, the transmitting UE may transmit the sum of the payload of HARQ feedback for the PDSCH, the payload of confirmation HARQ feedback for the SL SPS DCI, and the payload of information on SL HARQ feedback to the base station by using the third PUCCH resource. For example, if the sum of the payload sizes is less than (or equal to) a specific value or a threshold value, the third PUCCH resource may be a resource related to a short PUCCH format. For example, if the sum of the payload sizes is greater than (or equal to) a specific value or a threshold value, the third PUCCH resource may be a resource related to a long PUCCH format. The specific value or the threshold value may be defined in the system, or configured for the UE, or pre-configured for the UE.

Alternatively, in the case of allocating the third PUCCH, the base station may determine/decide (in advance) whether a transmission time of HARQ feedback, a transmission time of information on SL HARQ feedback and/or a transmission time of confirmation HARQ feedback for the SL SPS DCI of the transmitting UE are overlapped. Alternatively, in the case of allocating the third PUCCH, the base station may determine/decide (in advance) whether a time resource for transmitting HARQ feedback for the PDSCH by the transmitting UE, a time resource for transmitting information on SL HARQ feedback by the transmitting UE and/or a time resource for transmitting confirmation HARQ feedback for the SL SPS DCI by the transmitting UE are overlapped. For example, if the base station determines/decides (in advance) that the transmission time of HARQ feedback, the transmission time of information on SL HARQ feedback and/or the transmission time of confirmation HARQ feedback for the SL SPS DCI of the transmitting UE are overlapped, or if the base station determines/decides (in advance) that the time resource for transmitting HARQ feedback for the PDSCH by the transmitting UE, the time resource for transmitting information on SL HARQ feedback by the transmitting UE and/or the time resource for transmitting confirmation HARQ feedback for the SL SPS DCI by the transmitting UE are overlapped, the base station may allocate an independent PUCCH resource (e.g., the first PUCCH resource, the second PUCCH resource or the fourth PUCCH resource) to the transmitting UE.

For example, if the base station determines/decides (in advance) that the transmission time of HARQ feedback, the transmission time of information on SL HARQ feedback and/or the transmission time of confirmation HARQ feedback for the SL SPS DCI of the transmitting UE are overlapped, or if the base station determines/decides (in advance) that the time resource for transmitting HARQ feedback for the PDSCH by the transmitting UE, the time resource for transmitting information on SL HARQ feedback by the transmitting UE and/or the time resource for transmitting confirmation HARQ feedback for the SL SPS DCI by the transmitting UE are overlapped, the base station may separately allocate the first PUCCH resource and the second PUCCH resource to the transmitting UE. Therefore, the transmitting UE may transmit confirmation HARQ feedback for the SL SPS DCI to the base station by using the third PUCCH resource, and the transmitting UE may transmit HARQ feedback for the PDSCH to the base station by using the second PUCCH resource, and the transmitting UE may transmit information on SL HARQ feedback to the base station by using the first PUCCH resource.

For example, if the base station determines/decides (in advance) that the transmission time of HARQ feedback, the transmission time of information on SL HARQ feedback and/or the transmission time of confirmation HARQ feedback for the SL SPS DCI of the transmitting UE are overlapped, or if the base station determines/decides (in advance) that the time resource for transmitting HARQ feedback for the PDSCH by the transmitting UE, the time resource for transmitting information on SL HARQ feedback by the transmitting UE and/or the time resource for transmitting confirmation HARQ feedback for the SL SPS DCI by the transmitting UE are overlapped, the base station may separately allocate the second PUCCH resource and the fourth PUCCH resource to the transmitting UE. Therefore, the transmitting UE may transmit confirmation HARQ feedback for the SL SPS DCI to the base station by using the fourth PUCCH resource, and the transmitting UE may transmit HARQ feedback for the PDSCH to the base station by using the second PUCCH resource, and the transmitting UE may transmit information on SL HARQ feedback to the base station by using the third PUCCH resource.

For example, if the base station determines/decides (in advance) that the transmission time of HARQ feedback, the transmission time of information on SL HARQ feedback and/or the transmission time of confirmation HARQ feedback for the SL SPS DCI of the transmitting UE are overlapped, or if the base station determines/decides (in advance) that the time resource for transmitting HARQ feedback for the PDSCH by the transmitting UE, the time resource for transmitting information on SL HARQ feedback by the transmitting UE and/or the time resource for transmitting confirmation HARQ feedback for the SL SPS DCI by the transmitting UE are overlapped, the base station may separately allocate the first PUCCH resource, the second PUCCH resource, and the fourth PUCCH resource to the transmitting UE. Therefore, the transmitting UE may transmit confirmation HARQ feedback for the SL SPS DCI to the base station by using the fourth PUCCH resource, and the transmitting UE may transmit HARQ feedback for the PDSCH to the base station by using the second PUCCH resource, and transmitting UE may transmit information on SL HARQ feedback to the base station by using the first PUCCH resource.

For example, if the base station determines/decides (in advance) that the transmission time of HARQ feedback, the transmission time of information on SL HARQ feedback and/or the transmission time of confirmation HARQ feedback for the SL SPS DCI of the transmitting UE are not overlapped, or if the base station determines/decides (in advance) that the time resource for transmitting HARQ feedback for the PDSCH by the transmitting UE, the time resource for transmitting information on SL HARQ feedback by the transmitting UE and/or the time resource for transmitting confirmation HARQ feedback for the SL SPS DCI by the transmitting UE are not overlapped, the transmitting UE may transmit HARQ feedback, SL SPS DCI confirmation HARQ feedback, and SL HARQ feedback by sharing the third PUCCH resource.

3) In the Case of Allocating the First PUCCH Resource, the Second PUCCH Resource and/or the Fourth PUCCH Resource in the Form of Multiplexing Based on an embodiment of the present disclosure, the base station may allocate a PUCCH resource to the transmitting UE so that the transmitting UE multiplexes and transmits HARQ feedback for the PDSCH, information on SL HARQ feedback, and/or confirmation HARQ feedback for the SL SPS DCI.

For example, based on the payload size of HARQ feedback for the PDSCH, the payload size of confirmation HARQ feedback for the SL SPS DCI and/or the payload size of information on SL HARQ feedback, the transmitting UE may transmit HARQ feedback for the PDSCH, confirmation HARQ feedback for the SL SPS DCI, and/or information on SL HARQ feedback to the base station by using a short PUCCH resource or a long PUCCH resource. For example, if the sum of the payload size of HARQ feedback for PDSCH, the payload size of confirmation HARQ feedback for the SL SPS DCI and/or the payload size of information on SL HARQ feedback is less than (or equal to) a specific value or a threshold value, the transmitting UE may add the payload of HARQ feedback for the PDSCH, the payload of confirmation HARQ feedback for the SL SPS DCI, and/or the payload of information on SL HARQ feedback, and transmit it to the base station by using a short PUCCH resource. For example, if the sum of the payload size of HARQ feedback for PDSCH, the payload size of confirmation HARQ feedback for the SL SPS DCI and/or the payload size of information on SL HARQ feedback is greater than (or equal to) a specific value or a threshold value, the transmitting UE may add the payload of HARQ feedback for the PDSCH, the payload of confirmation HARQ feedback for the SL SPS DCI, and/or the payload of information on SL HARQ feedback, and transmit it to the base station by using a long PUCCH resource. For example, the specific value or the threshold value may be defined in the system. For example, the specific value or the threshold value may be configured or pre-configured for the UE.

For example, the base station may allocate the first PUCCH resource, the second PUCCH resource, and/or the fourth PUCCH resource to be adjacent on a frequency axis. In this case, the first PUCCH resource, the second PUCCH resource and/or the fourth PUCCH resource may be allocated in the form of frequency division multiplexing (FDM). Accordingly, the transmitting UE may transmit HARQ feedback for the PDSCH to the base station by using the second PUCCH resource, and the transmitting UE may transmit information on SL HARQ feedback to the base station by using the first PUCCH resource, and the transmitting UE may transmit confirmation HARQ feedback for the SL SPS DCI to the base station by using the fourth PUCCH resource.

Meanwhile, the base station may transmit a plurality of PDSCHs to the transmitting UE within one slot, and the UE may transmit HARQ feedback for each PDSCH to the base station by using a bitmap. In this case, the bitmap may include bit fields corresponding to HARQ feedback for each PDSCH. For example, if a value of the bit field included in the bitmap is 1, ACK for a PDSCH may be indicated, and if 0, NACK for a PDSCH may be indicated.

For example, if the UE transmits HARQ feedback for each PDSCH to the base station by using the bitmap, according to a rule configured or received by RRC signaling or a MAC CE, the transmitting UE may allocate or use a specific bit field of the bitmap for SL HARQ feedback report and/or confirmation HARQ feedback report for the SL SPS DCI. Alternatively, according to a rule signaled by the DCI or the SL DCI, the transmitting UE may allocate or use a specific bit field of the bitmap for SL HARQ feedback report and/or confirmation HARQ feedback report for the SL SPS DCI. Accordingly, the transmitting UE may report information on SL HARQ feedback received from the receiving UE and/or confirmation HARQ feedback report for the SL SPS DCI to the base station by using a specific bit field of the bitmap. For example, if a value of the specific bit field is 1, information on SL HARQ ACK may be indicated, and if a value of the specific field is 0, information on SL HARQ NACK may be indicated. Alternatively, for example, if a value of the specific bit field is 0 or 1, confirmation HARQ feedback for the SL SPS DCI may be indicated. For example, a value of the specific bit field may be determined as a different bit value for each slot based on a slot index. For example, a value of the specific bit field may be reset to a value of 0 at the start of the frame, and the value of the specific bit field may be sequentially determined when a corresponding event occurs based on a bitmap counter that increases by 1 for every slot in the frame.

Alternatively, for example, in case the UE transmits HARQ feedback for each PDSCH to the base station by using the bitmap, according to a rule configured or received by RRC signaling or a MAC CE, the transmitting UE may transmit at least one of HARQ feedback for each PDSCH, confirmation HARQ feedback for the SL SPS DCI, and/or information on SL HARQ feedback to the base station, based on a service priority, QoS and/or a cast type (e.g., unicast, groupcast or broadcast). Alternatively, according to a rule signaled by the DCI or the SL DCI, the transmitting UE may transmit at least one of HARQ feedback for each PDSCH, confirmation HARQ feedback for the SL SPS DCI, and/or information on SL HARQ feedback to the base station, based on a service priority, QoS and/or a cast type (e.g., unicast, groupcast or broadcast). For example, if a priority of sidelink information transmitted by the transmitting UE is higher than a pre-configured priority, the transmitting UE may transmit information on SL HARQ feedback received from the receiving UE to the base station by using the first PUCCH resource. On the other hand, the transmitting UE may not transmit HARQ feedback for the PDSCH and confirmation HARQ feedback for the SL SPS DCI to the base station.

Alternatively, for example, in case the UE transmits HARQ feedback for each PDSCH to the base station by using the bitmap, according to a rule configured or received by RRC signaling or a MAC CE, the transmitting UE may transmit at least one of HARQ feedback for each PDSCH, confirmation HARQ feedback for the SL SPS DCI, and/or information on SL HARQ feedback to the base station. Alternatively, according to a rule signaled by the DCI or the SL DCI, the transmitting UE may transmit at least one of HARQ feedback for each PDSCH, confirmation HARQ feedback for the SL SPS DCI, and/or information on SL HARQ feedback to the base station. For example, if the base station configures the transmitting UE to transmit HARQ feedback for each PDSCH with priority over confirmation HARQ feedback for the SL SPS DCI and information on SL HARQ feedback, the transmitting UE may transmit HARQ feedback for each PDSCH to the base station by using the second PUCCH resource. On the other hand, the transmitting UE may not transmit information on SL HARQ feedback received from the receiving UE and confirmation HARQ feedback for the SL SPS DCI to the base station.

Based on an embodiment of the present disclosure, the transmitting UE may efficiently report information on SL HARQ feedback and/or HARQ feedback for the PDSCH to the base station. In addition, the transmitting UE may efficiently report information on SL HARQ feedback, confirmation HARQ feedback for the SL SPS DCI, and/or HARQ feedback for the PDSCH to the base station.

Figure 22:
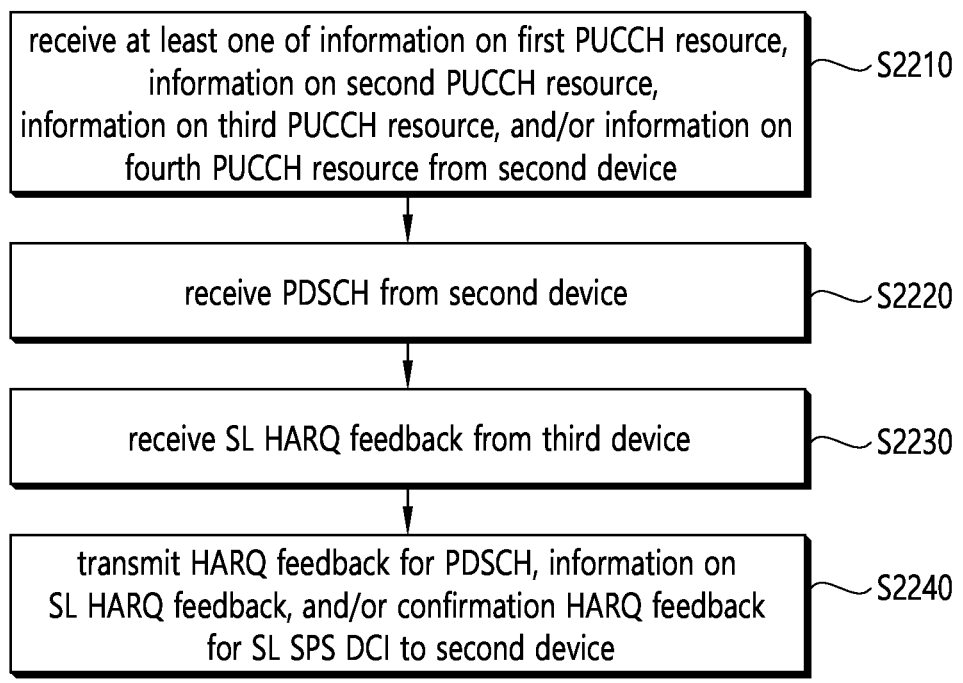
FIG. 22 shows a method for a first device to transmit HARQ feedback for a PDSCH and/or information on SL HARQ feedback to a second device, based on an embodiment of the present disclosure.

FIG. 22 shows a method for a first device to transmit HARQ feedback for a PDSCH and/or information on SL HARQ feedback to a second device, based on an embodiment of the present disclosure. The embodiment of FIG. 22 may be combined with various embodiments of the present disclosure.

Referring to FIG. 22, in step S2210, the first device may receive at least one of information on the first PUCCH resource, information on the second PUCCH resource, information on the third PUCCH resource, and/or information on the fourth PUCCH resource from the second device. For example, the second device may determine/allocate the first PUCCH resource, the second PUCCH resource, the third PUCCH resource, and/or the fourth PUCCH resource based on various embodiments proposed in the present disclosure. For example, the second device may be a base station. In step S2220, the first device may receive the PDSCH from the second device. In step S2230, the first device may receive SL HARQ feedback from a third device. For example, the third device may be at least one of the devices 100, 200, 100a, 100b, 100c, 100d, 100e, and 100f described in the present disclosure. In step S2240, the first device may transmit HARQ feedback for the PDSCH, information on SL HARQ feedback, and/or confirmation HARQ feedback for the SL SPS DCI to the second device based on various embodiments proposed in the present disclosure.

Figure 23:
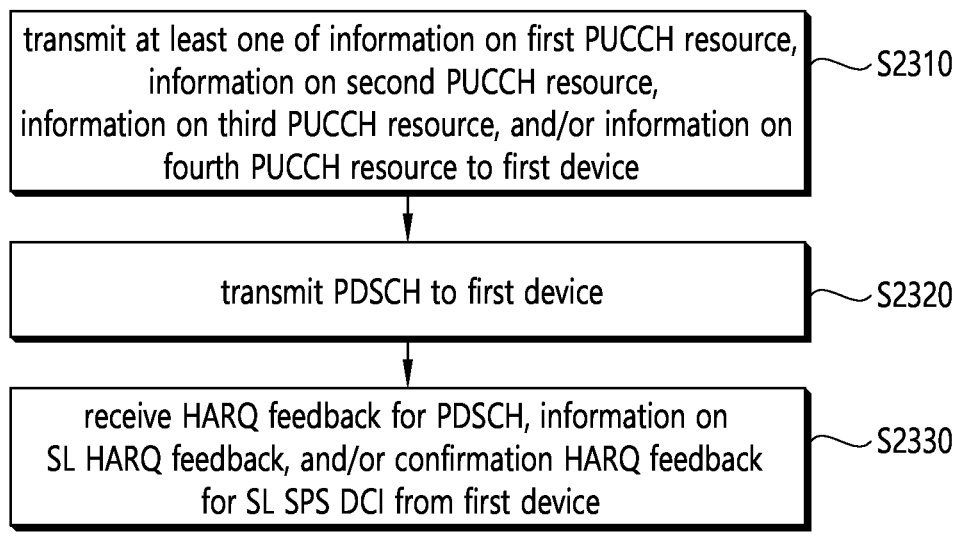
FIG. 23 shows a method for a second device to receive HARQ feedback for a PDSCH and/or information on SL HARQ feedback from a first device, based on an embodiment of the present disclosure.

FIG. 23 shows a method for a second device to receive HARQ feedback for a PDSCH and/or information on SL HARQ feedback from a first device, based on an embodiment of the present disclosure. The embodiment of FIG. 23 may be combined with various embodiments of the present disclosure.

Referring to FIG. 23, in step S2310, the second device may transmit at least one of information on the first PUCCH resource, information on the second PUCCH resource, information on the third PUCCH resource, and/or information on the fourth PUCCH resource to the first device. For example, the second device may determine/allocate the first PUCCH resource, the second PUCCH resource, the third PUCCH resource, and/or the fourth PUCCH resource based on various embodiments proposed in the present disclosure. For example, the second device may be a base station. In step S2320, the second device may transmit the PDSCH to the first device. In step S2330, the second device may receive HARQ feedback for the PDSCH, information on SL HARQ feedback, and/or confirmation HARQ feedback for the SL SPS DCI from the first device based on various embodiments proposed in the present disclosure.

Figure 24:
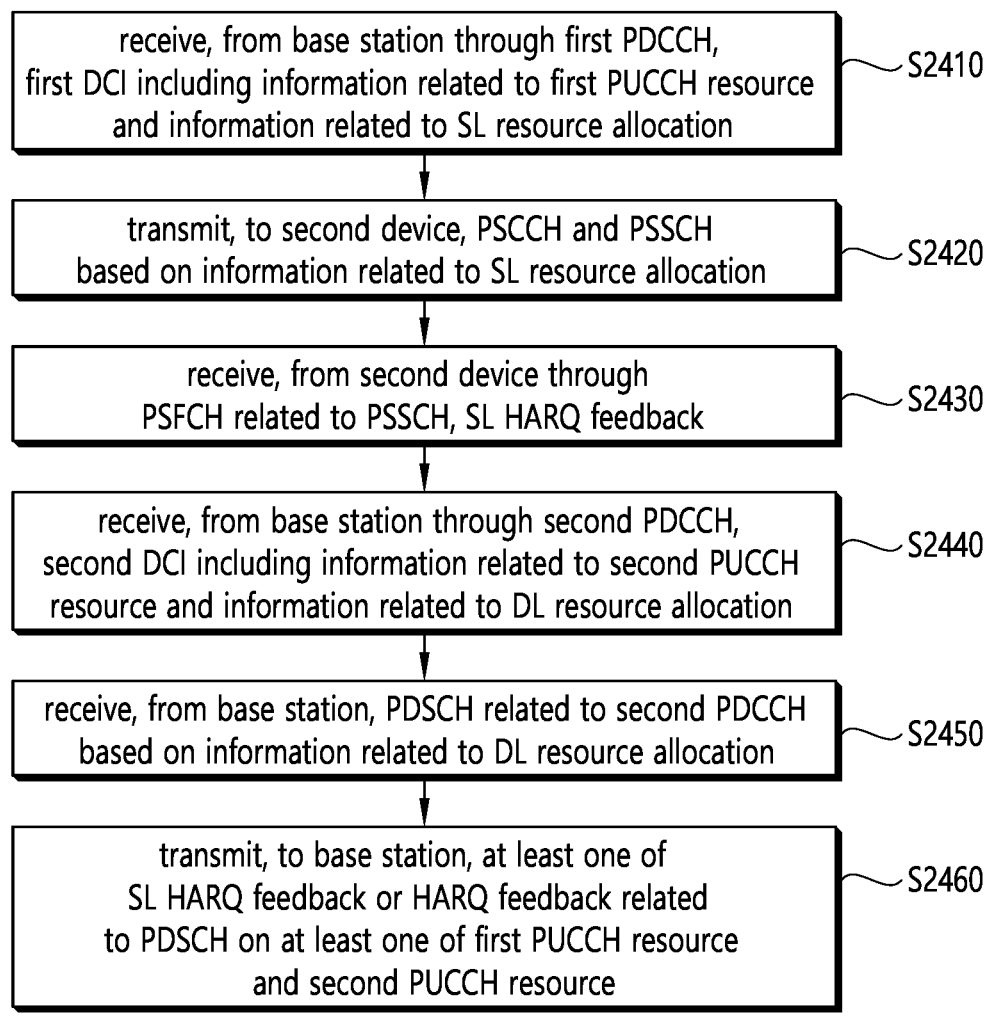
FIG. 24 shows a method for a first device to perform wireless communication, based on an embodiment of the present disclosure.

FIG. 24 shows a method for a first device to perform wireless communication, based on an embodiment of the present disclosure. The embodiment of FIG. 24 may be combined with various embodiments of the present disclosure.

Referring to FIG. 24, in step S2410, the first device may receive, from a base station through a first physical downlink control channel (PDCCH), a first downlink control information (DCI) including information related to a first physical uplink control channel (PUCCH) resource and information related to sidelink (SL) resource allocation. In step S2420, the first device may transmit, to a second device, a physical sidelink control channel (PSCCH) and a physical sidelink shared channel (PSSCH) based on the information related to the SL resource allocation. In step S2430, the first device may receive, from the second device through a physical sidelink feedback channel (PSFCH) related to the PSSCH, SL hybrid automatic repeat request (HARQ) feedback. In step S2440, the first device may receive, from the base station through a second PDCCH, a second DCI including information related to a second PUCCH resource and information related to a downlink (DL) resource allocation. In step S2450, the first device may receive, from the base station, a physical downlink shared channel (PDSCH) related to the second PDCCH based on the information related to the DL resource allocation. In step S2460, the first device may transmit, to the base station, at least one of the SL HARQ feedback or the HARQ feedback related to the PDSCH on at least one of the first PUCCH resource and the second PUCCH resource. For example, the first PUCCH resource and the second PUCCH resource may be overlapped in a time domain.

For example, the SL HARQ feedback may be transmitted on the first PUCCH resource and the HARQ feedback is not transmitted, based on a priority related to the PSSCH being higher than a pre-configured priority. For example, the priority related to the PSSCH may be included in a sidelink control information (SCI) on the PSCCH.

For example, one of the SL HARQ feedback or the HARQ feedback related to the PDSCH may be transmitted based on a priority between the HARQ feedback and the SL HARQ feedback. For example, the first device may not have a capability to simultaneously transmit the SL HARQ feedback and the HARQ feedback. For example, a priority of the HARQ feedback related to the PDSCH may be a priority related to a service or a packet transmitted through the PDSCH, and a priority of the SL HARQ feedback may be a priority related to a service or a packet transmitted through the PSSCH, and feedback with a higher priority among the SL HARQ feedback or the HARQ feedback may be transmitted, and feedback with a lower priority among the SL HARQ feedback or the HARQ feedback may not be transmitted, and the first device may not have a capability to simultaneously transmit the SL HARQ feedback and the HARQ feedback.

Additionally, for example, the first device may receive, from the base station, information informing that the HARQ feedback is prioritized over the SL HARQ feedback. For example, based on the information informing that the HARQ feedback is prioritized over the SL HARQ feedback, the HARQ feedback may be transmitted on the second PUCCH resource and the SL HARQ feedback may not be transmitted.

For example, the SL HARQ feedback and the HARQ feedback may be transmitted on the first PUCCH resource. For example, the SL HARQ feedback and the HARQ feedback may be transmitted on the second PUCCH resource. For example, the second PUCCH resource may be a resource related to a long PUCCH format, based on a sum of a payload size of the SL HARQ feedback and a payload size of the HARQ feedback being greater than a threshold.

Additionally, for example, the first device may transmit, to the base station, at least one of the SL HARQ feedback or the HARQ feedback on a third PUCCH resource. For example, information related to the third PUCCH resource may be included in the first DCI or the second DCI.

Additionally, for example, the first device may receive, from the base station through a third PDCCH, a third DCI including information related to a fourth PUCCH resource and information related to activation or release of a configured grant resource. For example, at least one of the SL HARQ feedback, the HARQ feedback related to the PDSCH, or confirmation HARQ feedback related to the third DCI may be transmitted to the base station on at least one of the first PUCCH resource, the second PUCCH resource, or the fourth PUCCH resource. For example, the first PUCCH resource, the second PUCCH resource and the fourth PUCCH resource may be overlapped in a time domain. For example, based on a priority related to the PSSCH being higher than a pre-configured priority, the SL HARQ feedback may be transmitted on the first PUCCH resource and the HARQ feedback and the confirmation HARQ feedback may not be transmitted.

For example, the SL HARQ feedback and the HARQ feedback may be transmitted on the first PUCCH resource and the second PUCCH resource, and the first PUCCH resource and the second PUCCH resource may be allocated adjacently in a frequency domain.

For example, based on the PDSCH being a plurality of PDSCHs received on one slot, the HARQ feedback may include a plurality of bits representing HARQ ACK or HARQ NACK for each of the plurality of PDSCHs. For example, based on the SL HARQ feedback not being transmitted on the first PUCCH resource, a specific bit among the plurality of bits included in the HARQ feedback transmitted on the second PUCCH resource may represent HARQ ACK or HARQ NACK for the PSSCH. For example, a value of the specific bit may be determined based on an index of a slot. For example, the value of the specific bit may be determined based on a priority related to the PSSCH related to the first PUCCH and a priority related to the PDSCH related to the second PUCCH.

The proposed method can be applied to the device(s) described below. First, the processor (102) of the first device (100) may control the transceiver (106) to receive, from a base station through a first physical downlink control channel (PDCCH), a first downlink control information (DCI) including information related to a first physical uplink control channel (PUCCH) resource and information related to sidelink (SL) resource allocation. In addition, the processor (102) of the first device (100) may control the transceiver (106) to transmit, to a second device, a physical sidelink control channel (PSCCH) and a physical sidelink shared channel (PSSCH) based on the information related to the SL resource allocation. In addition, the processor (102) of the first device (100) may control the transceiver (106) to receive, from the second device through a physical sidelink feedback channel (PSFCH) related to the PSSCH, SL hybrid automatic repeat request (HARQ) feedback. In addition, the processor (102) of the first device (100) may control the transceiver (106) to receive, from the base station through a second PDCCH, a second DCI including information related to a second PUCCH resource and information related to a downlink (DL) resource allocation. In addition, the processor (102) of the first device (100) may control the transceiver (106) to receive, from the base station, a physical downlink shared channel (PDSCH) related to the second PDCCH based on the information related to the DL resource allocation. In addition, the processor (102) of the first device (100) may control the transceiver (106) to transmit, to the base station, at least one of the SL HARQ feedback or the HARQ feedback related to the PDSCH on at least one of the first PUCCH resource and the second PUCCH resource. For example, the first PUCCH resource and the second PUCCH resource may be overlapped in a time domain.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station through a first physical downlink control channel (PDCCH), a first downlink control information (DCI) including information related to a first physical uplink control channel (PUCCH) resource and information related to sidelink (SL) resource allocation; transmit, to a second device, a physical sidelink control channel (PSCCH) and a physical sidelink shared channel (PSSCH) based on the information related to the SL resource allocation; receive, from the second device through a physical sidelink feedback channel (PSFCH) related to the PSSCH, SL hybrid automatic repeat request (HARQ) feedback; receive, from the base station through a second PDCCH, a second DCI including information related to a second PUCCH resource and information related to a downlink (DL) resource allocation; receive, from the base station, a physical downlink shared channel (PDSCH) related to the second PDCCH based on the information related to the DL resource allocation; and transmit, to the base station, at least one of the SL HARQ feedback or the HARQ feedback related to the PDSCH on at least one of the first PUCCH resource and the second PUCCH resource. For example, the first PUCCH resource and the second PUCCH resource may be overlapped in a time domain.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from a base station through a first physical downlink control channel (PDCCH), a first downlink control information (DCI) including information related to a first physical uplink control channel (PUCCH)

resource and information related to sidelink (SL) resource allocation; transmit, to a second user equipment (UE), a physical sidelink control channel (PSCCH) and a physical sidelink shared channel (PSSCH) based on the information related to the SL resource allocation; receive, from the second UE through a physical sidelink feedback channel (PSFCH) related to the PSSCH, SL hybrid automatic repeat request (HARQ) feedback; receive, from the base station through a second PDCCH, a second DCI including information related to a second PUCCH resource and information related to a downlink (DL) resource allocation; receive, from the base station, a physical downlink shared channel (PDSCH) related to the second PDCCH based on the information related to the DL resource allocation; and transmit, to the base station, at least one of the SL HARQ feedback or the HARQ feedback related to the PDSCH on at least one of the first PUCCH resource and the second PUCCH resource. For example, the first PUCCH resource and the second PUCCH resource may be overlapped in a time domain.

Based on an embodiment of the present disclosure, a non-transitory computer-readable storage medium storing instructions may be provided. For example, the instructions, when executed, may cause a first device to: receive, from a base station through a first physical downlink control channel (PDCCH), a first downlink control information (DCI) including information related to a first physical uplink control channel (PUCCH) resource and information related to sidelink (SL) resource allocation; transmit, to a second device, a physical sidelink control channel (PSCCH) and a physical sidelink shared channel (PSSCH) based on the information related to the SL resource allocation; receive, from the second device through a physical sidelink feedback channel (PSFCH) related to the PSSCH, SL hybrid automatic repeat request (HARQ) feedback; receive, from the base station through a second PDCCH, a second DCI including information related to a second PUCCH resource and information related to a downlink (DL) resource allocation; receive, from the base station, a physical downlink shared channel (PDSCH) related to the second PDCCH based on the information related to the DL resource allocation; and transmit, to the base station, at least one of the SL HARQ feedback or the HARQ feedback related to the PDSCH on at least one of the first PUCCH resource and the second PUCCH resource. For example, the first PUCCH resource and the second PUCCH resource may be overlapped in a time domain.

Figure 25:
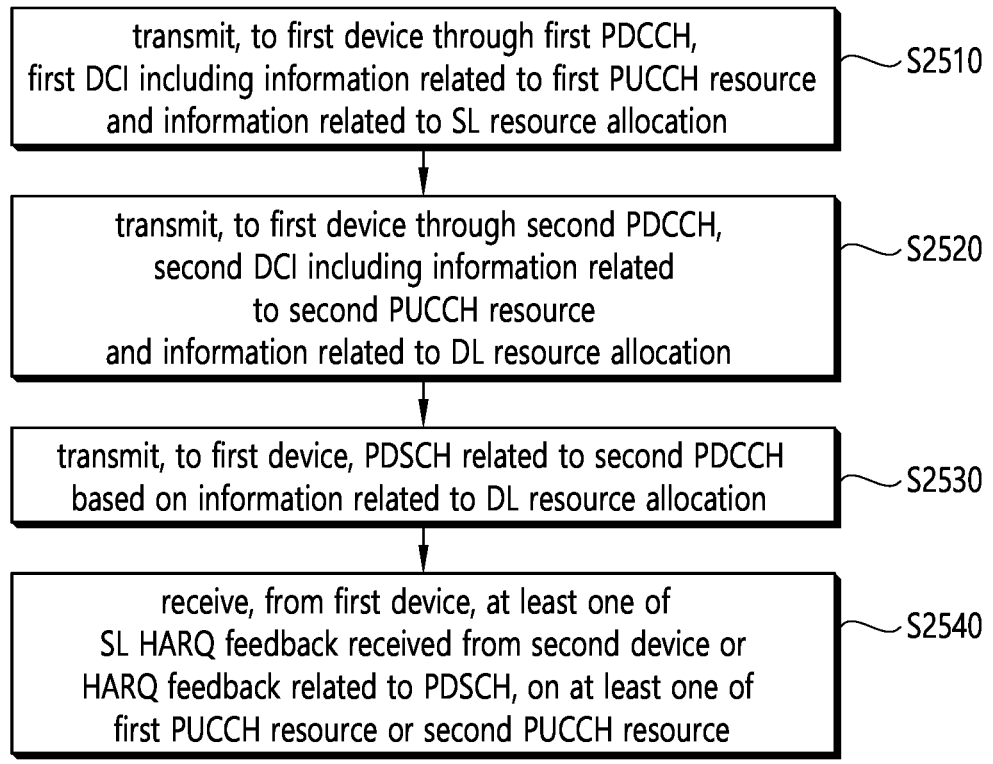
FIG. 25 shows a method for a base station to perform wireless communication, based on an embodiment of the present disclosure.

FIG. 25 shows a method for a base station to perform wireless communication, based on an embodiment of the present disclosure. The embodiment of FIG. 25 may be combined with various embodiments of the present disclosure.

Referring to FIG. 25, in step S2510, the base station may transmit, to a first device through a first physical downlink control channel (PDCCH), a first downlink control information (DCI) including information related to a first physical uplink control channel (PUCCH) resource and information related to a sidelink (SL) resource allocation. In step S2520, the base station may transmit, to the first device through a second PDCCH, a second DCI including information related to a second PUCCH resource and information related to a downlink (DL) resource allocation. In step S2530, the base station may transmit, to the first device, a physical downlink shared channel (PDSCH) related to the second PDCCH based on the information related to the DL resource allocation. In step S2540, the base station may receive, from the first device, at least one of SL hybrid automatic repeat request (HARQ) feedback received from a second device or HARQ feedback related to the PDSCH, on at least one of the first PUCCH resource or the second PUCCH resource. For example, the SL HARQ feedback may be transmitted, in response to a physical sidelink control channel (PSCCH) and a physical sidelink shared channel (PSSCH) transmitted by the first device based on the information related to the SL resource allocation, by the second device through a physical sidelink feedback channel (PSFCH) related to the PSSCH. For example, the first PUCCH resource and the second PUCCH resource may be overlapped in a time domain.

The proposed method can be applied to the device(s) described below. First, the processor (202) of the base station (200) may control the transceiver (206) to transmit, to a first device through a first physical downlink control channel (PDCCH), a first downlink control information (DCI) including information related to a first physical uplink control channel (PUCCH) resource and information related to a sidelink (SL) resource allocation. In addition, the processor (202) of the base station (200) may control the transceiver (206) to transmit, to the first device through a second PDCCH, a second DCI including information related to a second PUCCH resource and information related to a downlink (DL) resource allocation. In addition, the processor (202) of the base station (200) may control the transceiver (206) to transmit, to the first device, a physical downlink shared channel (PDSCH) related to the second PDCCH based on the information related to the DL resource allocation. In addition, the processor (202) of the base station (200) may control the transceiver (206) to receive, from the first device, at least one of SL hybrid automatic repeat request (HARQ) feedback received from a second device or HARQ feedback related to the PDSCH, on at least one of the first PUCCH resource or the second PUCCH resource. For example, the SL HARQ feedback may be transmitted, in response to a physical sidelink control channel (PSCCH) and a physical sidelink shared channel (PSSCH) transmitted by the first device based on the information related to the SL resource allocation, by the second device through a physical sidelink feedback channel (PSFCH) related to the PSSCH. For example, the first PUCCH resource and the second PUCCH resource may be overlapped in a time domain.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device through a first physical downlink control channel (PDCCH), a first downlink control information (DCI) including information related to a first physical uplink control channel (PUCCH) resource and information related to a sidelink (SL) resource allocation; transmit, to the first device through a second PDCCH, a second DCI including information related to a second PUCCH resource and information related to a downlink (DL) resource allocation; transmit, to the first device, a physical downlink shared channel (PDSCH) related to the second PDCCH based on the information related to the DL resource allocation; and receive, from the first device, at least one of SL hybrid automatic repeat request (HARQ) feedback received from a second device or HARQ feedback related to the PDSCH, on at least one of the first PUCCH resource or the second PUCCH resource. For example, the SL HARQ feedback may be transmitted, in response to a physical sidelink control channel (PSCCH) and a physical sidelink shared channel (PSSCH) transmitted by the first device based on the information related to the SL resource allocation, by the second device through a physical sidelink feedback channel (PSFCH) related to the PSSCH. For example, the first PUCCH resource and the second PUCCH resource may be overlapped in a time domain.

Based on an embodiment of the present disclosure, an apparatus configured to control a base station may be provided. For example, the apparatus may comprise: one or more processors; and one or more memories operably connected to the one or more processors and storing instructions. For example, the one or more processors may execute the instructions to: transmit, to a first user equipment (UE) through a first physical downlink control channel (PDCCH), a first downlink control information (DCI) including information related to a first physical uplink control channel (PUCCH) resource and information related to a sidelink (SL) resource allocation; transmit, to the first UE through a second PDCCH, a second DCI including information related to a second PUCCH resource and information related to a downlink (DL) resource allocation; transmit, to the first UE, a physical downlink shared channel (PDSCH) related to the second PDCCH based on the information related to the DL resource allocation; and receive, from the first UE, at least one of SL hybrid automatic repeat request (HARQ) feedback received from a second UE or HARQ feedback related to the PDSCH, on at least one of the first PUCCH resource or the second PUCCH resource. For example, the SL HARQ feedback may be transmitted, in response to a physical sidelink control channel (PSCCH) and a physical sidelink shared channel (PSSCH) transmitted by the first UE based on the information related to the SL resource allocation, by the second UE through a physical sidelink feedback channel (PSFCH) related to the PSSCH. For example, the first PUCCH resource and the second PUCCH resource may be overlapped in a time domain.

Based on an embodiment of the present disclosure, a non-transitory computer-readable storage medium storing instructions may be provided. For example, the instructions, when executed, may cause a base station to: transmit, to a first device through a first physical downlink control channel (PDCCH), a first downlink control information (DCI) including information related to a first physical uplink control channel (PUCCH) resource and information related to a sidelink (SL) resource allocation; transmit, to the first device through a second PDCCH, a second DCI including information related to a second PUCCH resource and information related to a downlink (DL) resource allocation; transmit, to the first device, a physical downlink shared channel (PDSCH) related to the second PDCCH based on the information related to the DL resource allocation; and receive, from the first device, at least one of SL hybrid automatic repeat request (HARQ) feedback received from a second device or HARQ feedback related to the PDSCH, on at least one of the first PUCCH resource or the second PUCCH resource. For example, the SL HARQ feedback may be transmitted, in response to a physical sidelink control channel (PSCCH) and a physical sidelink shared channel (PSSCH) transmitted by the first device based on the information related to the SL resource allocation, by the second device through a physical sidelink feedback channel (PSFCH) related to the PSSCH. For example, the first PUCCH resource and the second PUCCH resource may be overlapped in a time domain.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 26:
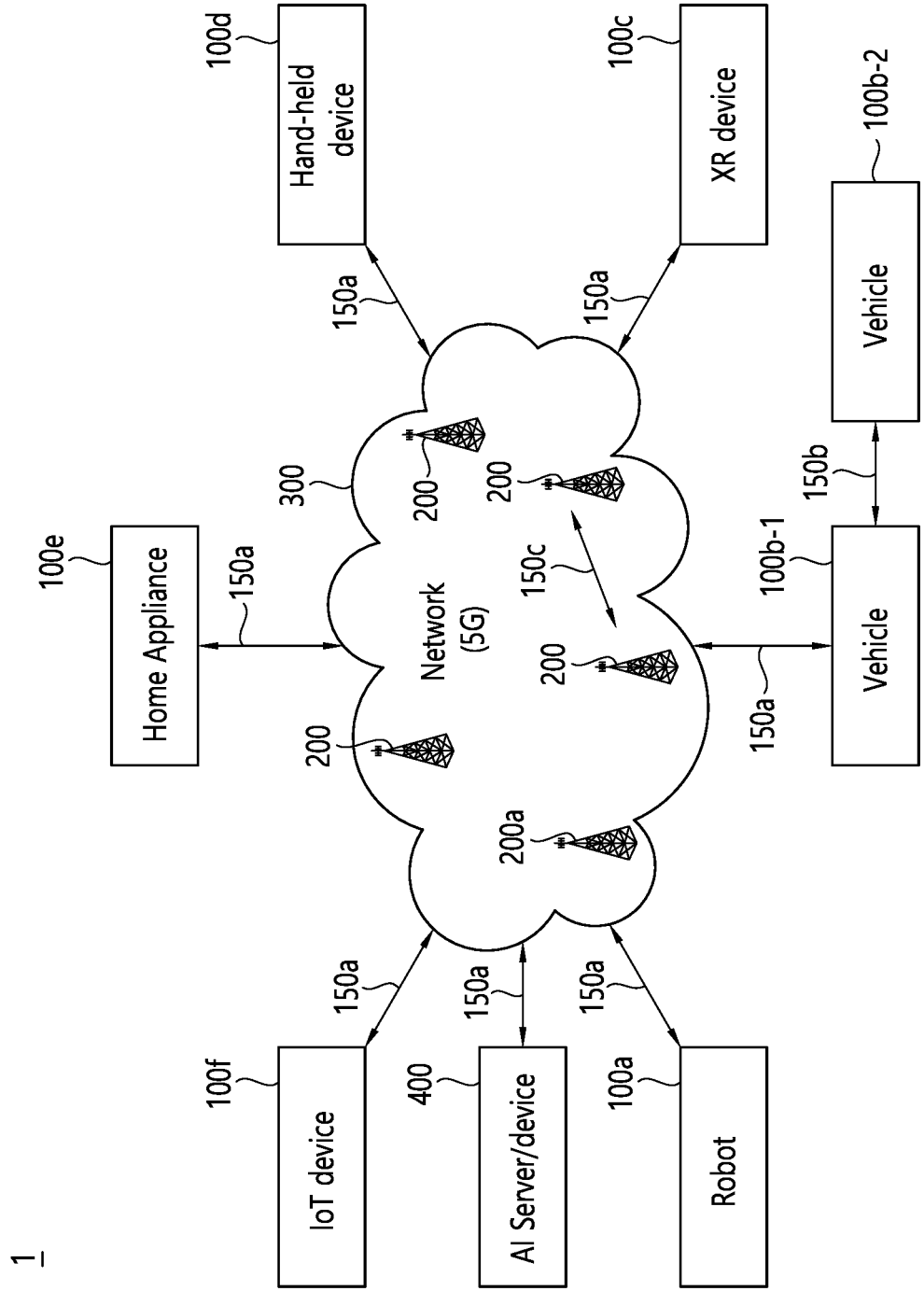
FIG. 26 shows a communication system 1, based on an embodiment of the present disclosure.

FIG. 26 shows a communication system 1, based on an embodiment of the present disclosure.

Referring to FIG. 26, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 27:
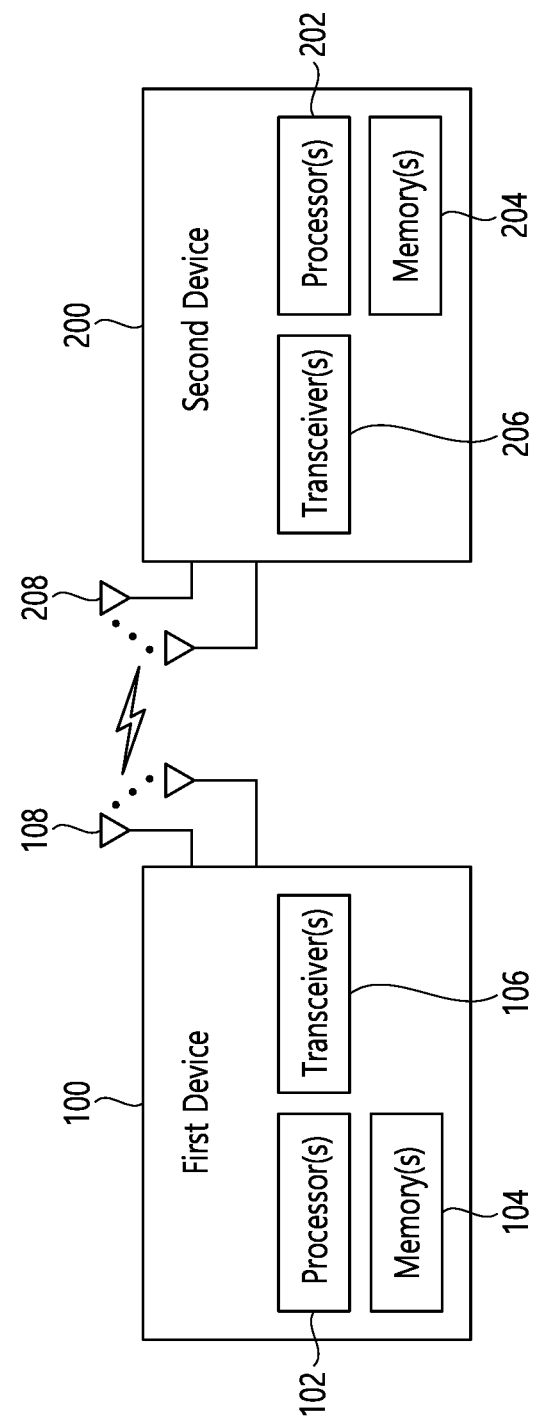
FIG. 27 shows wireless devices, based on an embodiment of the present disclosure.

FIG. 27 shows wireless devices, based on an embodiment of the present disclosure.

Referring to FIG. 27, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 28:
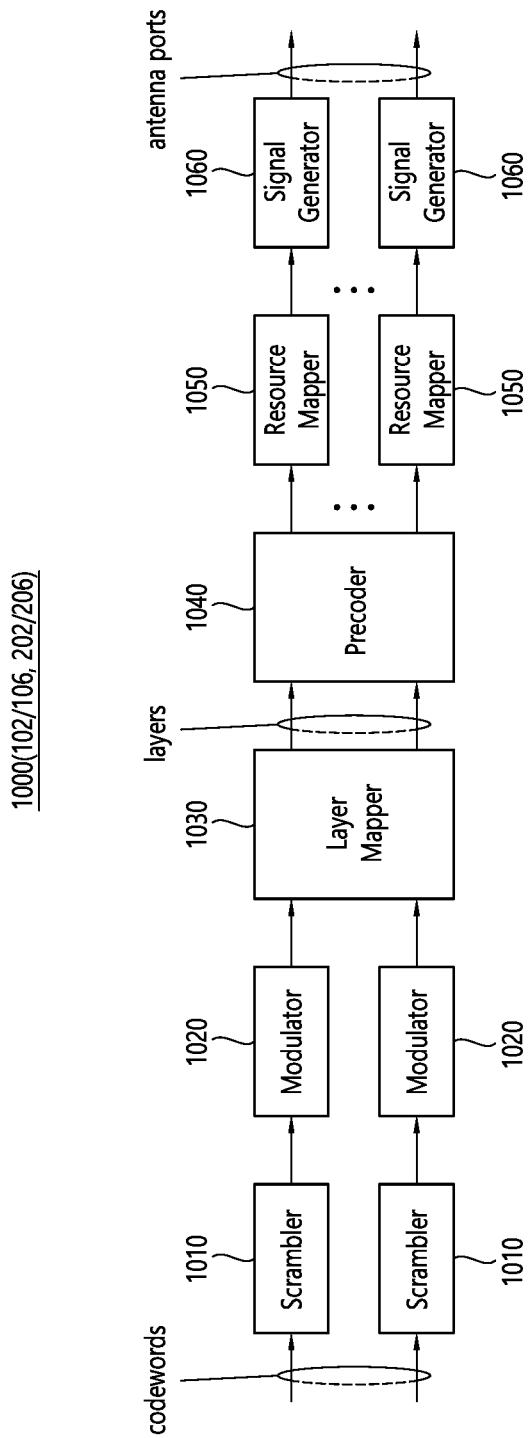
FIG. 28 shows a signal process circuit for a transmission signal, based on an embodiment of the present disclosure.

FIG. 28 shows a signal process circuit for a transmission signal, based on an embodiment of the present disclosure.

Referring to FIG. 28, a signal processing circuit 1000 may include scramblers 1010, modulators 1020, a layer mapper 1030, a precoder 1040, resource mappers 1050, and signal generators 1060. An operation/function of FIG. 28 may be performed, without being limited to, the processors 102 and 202 and/or the transceivers 106 and 206 of FIG. 27. Hardware elements of FIG. 28 may be implemented by the processors 102 and 202 and/or the transceivers 106 and 206 of FIG. 27. For example, blocks 1010 to 1060 may be implemented by the processors 102 and 202 of FIG. 27. Alternatively, the blocks 1010 to 1050 may be implemented by the processors 102 and 202 of FIG. 27 and the block 1060 may be implemented by the transceivers 106 and 206 of FIG. 27.

Codewords may be converted into radio signals via the signal processing circuit 1000 of FIG. 28. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 28. For example, the wireless devices (e.g., 100 and 200 of FIG. 27) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 29:
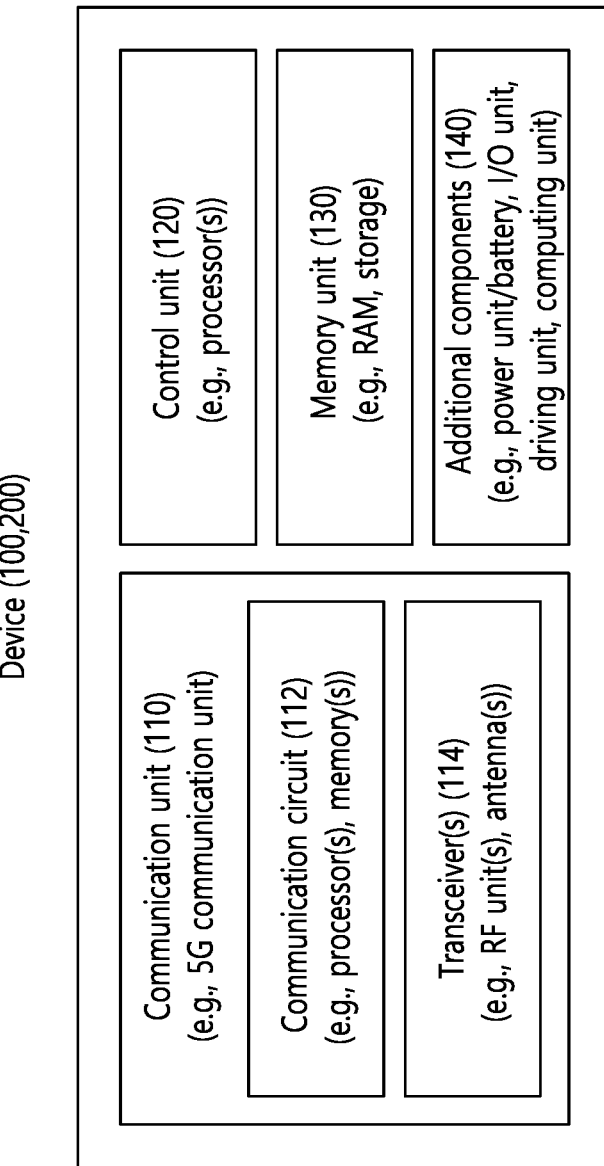
FIG. 29 shows another example of a wireless device, based on an embodiment of the present disclosure.

FIG. 29 shows another example of a wireless device, based on an embodiment of the present disclosure. The wireless device may be implemented in various forms according to a use-case/service (refer to FIG. 26).

Referring to FIG. 29, wireless devices 100 and 200 may correspond to the wireless devices 100 and 200 of FIG. 27 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 26), the vehicles (100b-1 and 100b-2 of FIG. 26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, etc. The wireless device may be used in a mobile or fixed place according to a use-example/service.

In FIG. 29, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 29 will be described in detail with reference to the drawings.

Figure 30:
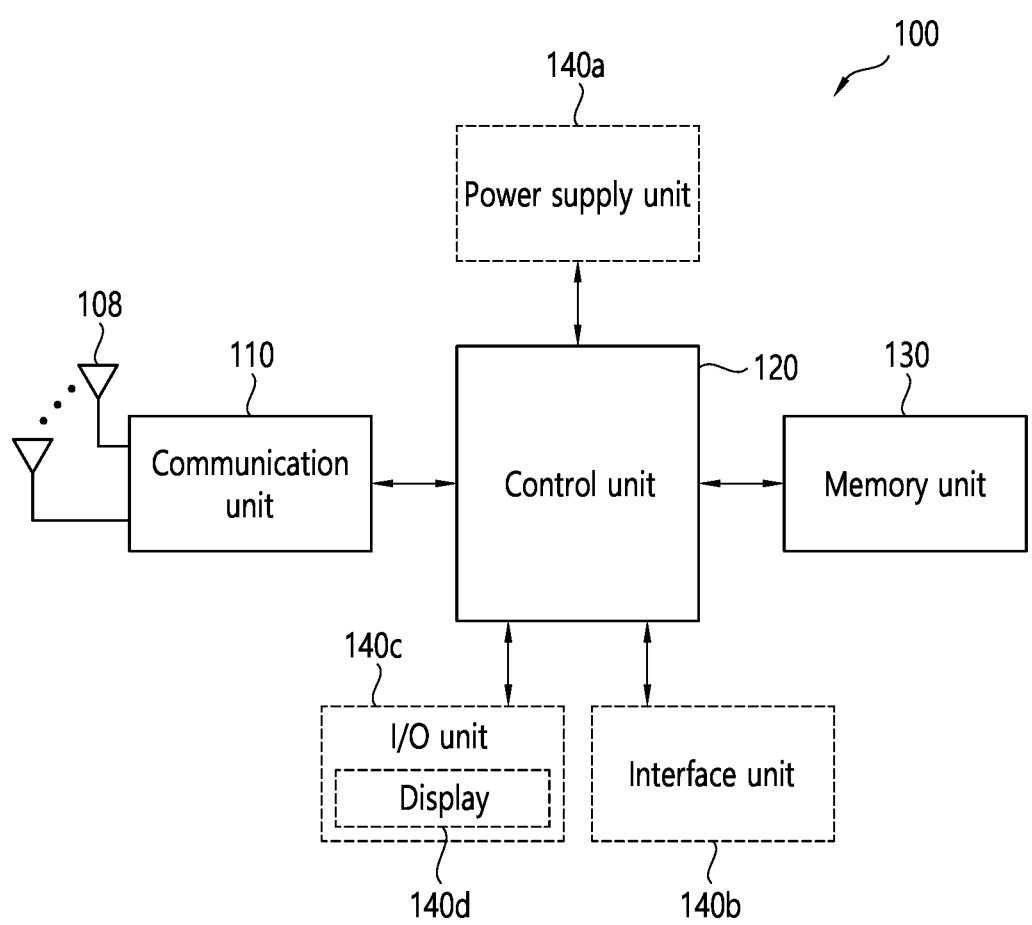
FIG. 30 shows a hand-held device, based on an embodiment of the present disclosure.

FIG. 30 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 30, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 29, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 31:
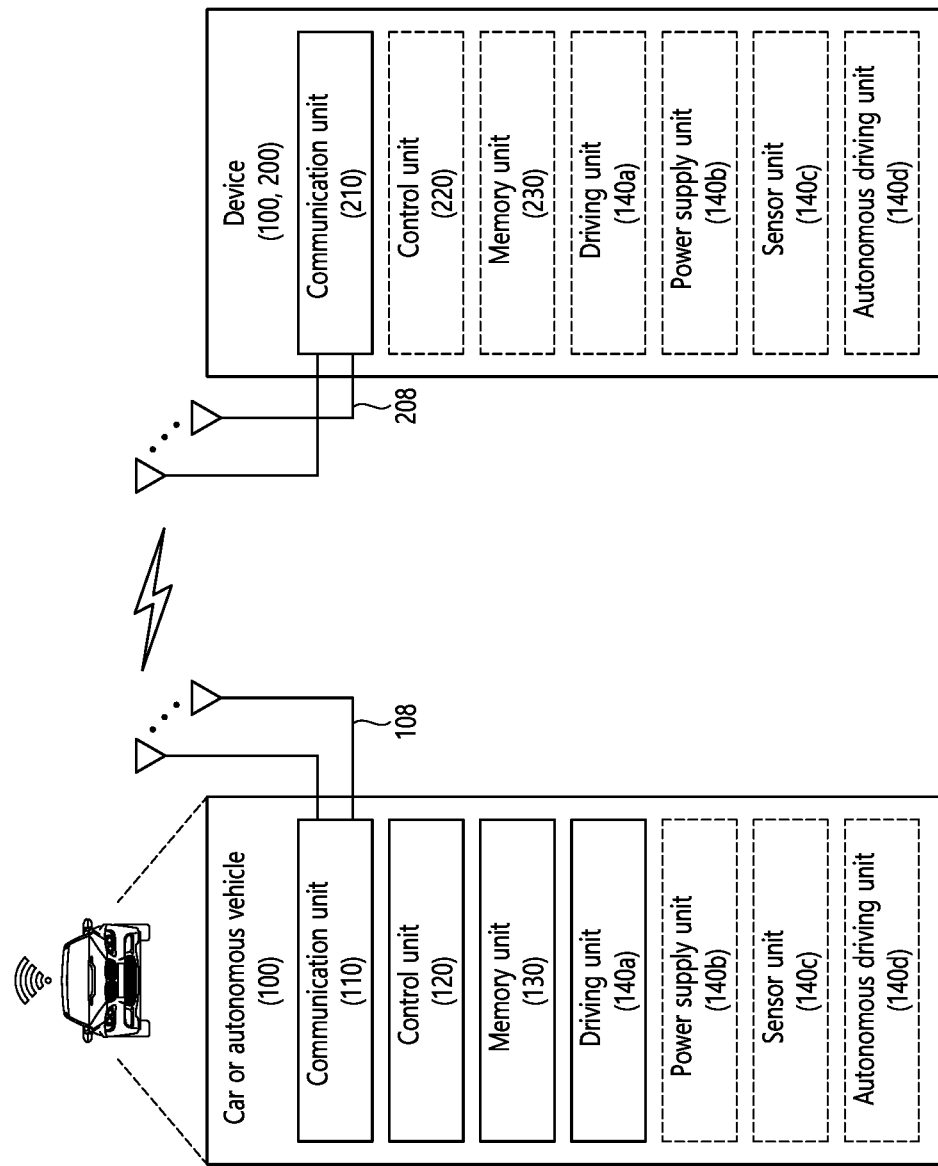
FIG. 31 shows a vehicle or an autonomous vehicle, based on an embodiment of the present disclosure.

FIG. 31 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 31, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 29, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   receiving, from a base station through a first physical downlink control channel (PDCCH), a first downlink control information (DCI) including information related to a first physical uplink control channel (PUCCH) resource and information related to sidelink (SL) resource allocation;
   transmitting, to a second device, a physical sidelink control channel (PSCCH) and a physical sidelink shared channel (PSSCH) based on the information related to the SL resource allocation;
   receiving, from the second device through a physical sidelink feedback channel (PSFCH) related to the PSSCH, SL hybrid automatic repeat request (HARQ) feedback;
   receiving, from the base station through a second PDCCH, a second DCI including information related to a second PUCCH resource and information related to a downlink (DL) resource allocation;
   receiving, from the base station, a physical downlink shared channel (PDSCH) related to the second PDCCH based on the information related to the DL resource allocation; and
   transmitting, to the base station, at least one of the SL HARQ feedback or the HARQ feedback related to the PDSCH on at least one of the first PUCCH resource and the second PUCCH resource,
   wherein the first PUCCH resource and the second PUCCH resource are overlapped in a time domain.

2. The method of claim 1, wherein the SL HARQ feedback is transmitted on the first PUCCH resource and the HARQ feedback is not transmitted, based on a priority related to the PSSCH being higher than a pre-configured priority.

3. The method of claim 1, wherein one of the SL HARQ feedback or the HARQ feedback related to the PDSCH is transmitted based on a priority between the HARQ feedback and the SL HARQ feedback.

4. The method of claim 3, wherein a priority of the HARQ feedback related to the PDSCH is a priority related to a service or a packet transmitted through the PDSCH,
wherein a priority of the SL HARQ feedback is a priority related to a service or a packet transmitted through the PSSCH,
wherein feedback with a higher priority among the SL HARQ feedback or the HARQ feedback is transmitted,
wherein feedback with a lower priority among the SL HARQ feedback or the HARQ feedback is not transmitted, and
wherein the first device does not have a capability to simultaneously transmit the SL HARQ feedback and the HARQ feedback.

5. The method of claim 1, further comprising:
receiving, from the base station, information informing that the HARQ feedback is prioritized over the SL HARQ feedback,
wherein, based on the information informing that the HARQ feedback is prioritized over the SL HARQ feedback, the HARQ feedback is transmitted on the second PUCCH resource and the SL HARQ feedback is not transmitted.

6. The method of claim 1, wherein the SL HARQ feedback and the HARQ feedback are transmitted on the first PUCCH resource.

7. The method of claim 1, wherein the SL HARQ feedback and the HARQ feedback are transmitted on the second PUCCH resource.

8. The method of claim 7, the second PUCCH resource is a resource related to a long PUCCH format, based on a sum of a payload size of the SL HARQ feedback and a payload size of the HARQ feedback being greater than a threshold.

9. The method of claim 1, wherein the SL HARQ feedback and the HARQ feedback are transmitted on the first PUCCH resource and the second PUCCH resource, and
wherein the first PUCCH resource and the second PUCCH resource are allocated adjacently in a frequency domain.

10. The method of claim 1, wherein, based on the PDSCH being a plurality of PDSCHs received on one slot, the HARQ feedback includes a plurality of bits representing HARQ ACK or HARQ NACK for each of the plurality of PDSCHs, and
wherein, based on the SL HARQ feedback not being transmitted on the first PUCCH resource, a specific bit among the plurality of bits included in the HARQ feedback transmitted on the second PUCCH resource represents HARQ ACK or HARQ NACK for the PSSCH.

11. The method of claim 10, wherein a value of the specific bit is determined based on an index of a slot, or the value of the specific bit is determined based on a priority related to the PSSCH related to the first PUCCH and a priority related to the PDSCH related to the second PUCCH.

12. The method of claim 1, further comprising:
transmitting, to the base station, at least one of the SL HARQ feedback or the HARQ feedback on a third PUCCH resource,
wherein information related to the third PUCCH resource is included in the first DCI or the second DCI.

13. The method of claim 1, further comprising:
receiving, from the base station through a third PDCCH, a third DCI including information related to a fourth PUCCH resource and information related to activation or release of a configured grant resource,
wherein at least one of the SL HARQ feedback, the HARQ feedback related to the PDSCH, or confirmation HARQ feedback related to the third DCI is transmitted to the base station on at least one of the first PUCCH resource, the second PUCCH resource, or the fourth PUCCH resource,
wherein the first PUCCH resource, the second PUCCH resource and the fourth PUCCH resource are overlapped in a time domain, and
wherein, based on a priority related to the PSSCH being higher than a pre-configured priority, the SL HARQ feedback is transmitted on the first PUCCH resource and the HARQ feedback and the confirmation HARQ feedback are not transmitted.

14. A first device configured to perform wireless communication, the first device comprising:
one or more memories storing instructions;
one or more transceivers; and
one or more processors connected to the one or more memories and the one or more transceivers, wherein the one or more processors execute the instructions to:
receive, from a base station through a first physical downlink control channel (PDCCH), a first downlink control information (DCI) including information related to a first physical uplink control channel (PUCCH) resource and information related to sidelink (SL) resource allocation;
transmit, to a second device, a physical sidelink control channel (PSCCH) and a physical sidelink shared channel (PSSCH) based on the information related to the SL resource allocation;
receive, from the second device through a physical sidelink feedback channel (PSFCH) related to the PSSCH, SL hybrid automatic repeat request (HARQ) feedback;
receive, from the base station through a second PDCCH, a second DCI including information related to a second PUCCH resource and information related to a downlink (DL) resource allocation;
receive, from the base station, a physical downlink shared channel (PDSCH) related to the second PDCCH based on the information related to the DL resource allocation; and
transmit, to the base station, at least one of the SL HARQ feedback or the HARQ feedback related to the PDSCH on at least one of the first PUCCH resource and the second PUCCH resource,
wherein the first PUCCH resource and the second PUCCH resource are overlapped in a time domain.

15. The first device of claim 14, wherein the SL HARQ feedback is transmitted on the first PUCCH resource and the HARQ feedback is not transmitted, based on a priority related to the PSSCH being higher than a pre-configured priority.

16. The first device of claim 14, wherein one of the SL HARQ feedback or the HARQ feedback related to the PDSCH is transmitted based on a priority between the HARQ feedback and the SL HARQ feedback.

17. The first device of claim 16, wherein a priority of the HARQ feedback related to the PDSCH is a priority related to a service or a packet transmitted through the PDSCH,
- wherein a priority of the SL HARQ feedback is a priority related to a service or a packet transmitted through the PSSCH,
- wherein feedback with a higher priority among the SL HARQ feedback or the HARQ feedback is transmitted,
- wherein feedback with a lower priority among the SL HARQ feedback or the HARQ feedback is not transmitted, and
- wherein the first device does not have a capability to simultaneously transmit the SL HARQ feedback and the HARQ feedback.

18. The first device of claim 14, wherein the one or more processors further execute the instructions to:
- receive, from the base station, information informing that the HARQ feedback is prioritized over the SL HARQ feedback,
- wherein, based on the information informing that the HARQ feedback is prioritized over the SL HARQ feedback, the HARQ feedback is transmitted on the second PUCCH resource and the SL HARQ feedback is not transmitted.

19. The first device of claim 14, wherein the SL HARQ feedback and the HARQ feedback are transmitted on the first PUCCH resource, or the SL HARQ feedback and the HARQ feedback are transmitted on the second PUCCH resource.

20. An apparatus configured to control a first user equipment (UE), the apparatus comprising:
- one or more processors; and
- one or more memories operably connected to the one or more processors and storing instructions, wherein the one or more processors execute the instructions to:
- receive, from a base station through a first physical downlink control channel (PDCCH), a first downlink control information (DCI) including information related to a first physical uplink control channel (PUCCH) resource and information related to sidelink (SL) resource allocation;
- transmit, to a second user equipment (UE), a physical sidelink control channel (PSCCH) and a physical sidelink shared channel (PSSCH) based on the information related to the SL resource allocation;
- receive, from the second UE through a physical sidelink feedback channel (PSFCH) related to the PSSCH, SL hybrid automatic repeat request (HARQ) feedback;
- receive, from the base station through a second PDCCH, a second DCI including information related to a second PUCCH resource and information related to a downlink (DL) resource allocation;
- receive, from the base station, a physical downlink shared channel (PDSCH) related to the second PDCCH based on the information related to the DL resource allocation; and
- transmit, to the base station, at least one of the SL HARQ feedback or the HARQ feedback related to the PDSCH on at least one of the first PUCCH resource and the second PUCCH resource,
- wherein the first PUCCH resource and the second PUCCH resource are overlapped in a time domain.

* * * * *